(12) United States Patent
Ran et al.

(10) Patent No.: US 12,586,461 B2
(45) Date of Patent: *Mar. 24, 2026

(54) CLOUD-BASED MODEL DEPLOYMENT AND CONTROL SYSTEM (CMDCS) FOR PROVIDING AUTOMATED DRIVING SERVICES

(71) Applicant: CAVH LLC, Fitchburg, WI (US)

(72) Inventors: Bin Ran, Fitchburg, WI (US); Can Wang, Madison, WI (US); Kaijie Luo, Madison, WI (US); Qiao Yang, Madison, WI (US); Yuan Zheng, Madison, WI (US); Jing Jin, Basking Ridge, NJ (US); Tianyi Chen, Madison, WI (US); Xiaowen Jiang, Madison, WI (US); Tianya Zhang, Madison, WI (US); Zhenxing Yao, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/779,372

(22) Filed: Jul. 22, 2024

(65) Prior Publication Data

US 2024/0378992 A1      Nov. 14, 2024

Related U.S. Application Data

(63) Continuation of application No. 16/454,268, filed on Jun. 27, 2019, now Pat. No. 12,057,011.
(Continued)

(51) Int. Cl.
    *G08G 1/01*        (2006.01)
    *G06F 21/62*      (2013.01)
    (Continued)

(52) U.S. Cl.
    CPC ....... *G08G 1/0125* (2013.01); *G06F 21/6254* (2013.01); *G08G 1/0968* (2013.01);
    (Continued)

(58) Field of Classification Search
    CPC .... G08G 1/0125; G08G 1/0968; G08G 1/202; G06F 21/6254; H04L 63/04; H04L 67/12; H04W 12/02; H04W 12/03
    See application file for complete search history.

(56) References Cited

U.S. PATENT DOCUMENTS

| | | | |
|---|---|---|---|
| 3,824,469 A | 7/1974 | Ristenbatt | |
| 4,023,017 A | 5/1977 | Ceseri | |

(Continued)

FOREIGN PATENT DOCUMENTS

| | | |
|---|---|---|
| CN | 102768768 B | 11/2012 |
| CN | 103854473 A | 6/2014 |

(Continued)

OTHER PUBLICATIONS

Bongsob Song and J. Karl Hedrick, "Design and Experimental Implementation of Longitudinal Control for Automated Transit Buses," Proceedings of the 2004 American Control Conference, Boston, MA, USA, 2004, pp. 2751-2756 vol. 3. (Year: 2004).*

(Continued)

*Primary Examiner* — Joan T Goodbody
(74) *Attorney, Agent, or Firm* — Casimir Jones, SC; Thomas A. Isenbarger

(57) ABSTRACT

The invention presents a cloud-based model deployment and control system (CMDCS) for providing automated driving services. The CMDCS comprises a cloud-based platform, an onboard unit (OBU), and a Vehicle-to-System component. The cloud-based platform comprises a localization-enhancement subsystem and a cloud computing module. The CMDCS is configured to collect detectable data and unde- (Continued)

tectable data from vehicles, road, and cloud. Then, the CMDCS deploys a set of end-to-end AI models and methods for automated driving services, comprising sensing, prediction, planning, and control services. The AI models and methods are trained and optimized to process collected data for providing operating parameters for vehicles. Then, the vehicles can be effectively and efficiently controlled and operated by the CMDCS. In addition, the CMDCS is configured to generate and provide detailed time-sensitive vehicle specific control instructions.

20 Claims, 16 Drawing Sheets

Related U.S. Application Data

(60) Provisional application No. 62/691,391, filed on Jun. 28, 2018.

(51) Int. Cl.

| | |
|---|---|
| *G08G 1/00* | (2006.01) |
| *G08G 1/0968* | (2006.01) |
| *H04L 9/40* | (2022.01) |
| *H04L 67/12* | (2022.01) |
| *H04W 12/02* | (2009.01) |
| *H04W 12/03* | (2021.01) |
| *H04W 12/12* | (2021.01) |

(52) U.S. Cl.
CPC ............. *G08G 1/202* (2013.01); *H04L 63/04* (2013.01); *H04L 63/1441* (2013.01); *H04L 67/12* (2013.01); *H04W 12/02* (2013.01); *H04W 12/03* (2021.01); *H04W 12/12* (2013.01)

(56) References Cited

U.S. PATENT DOCUMENTS

| | | | |
|---|---|---|---|
| 4,704,610 A | 11/1987 | Smith et al. |
| 4,962,457 A | 10/1990 | Chen et al. |
| 5,420,794 A | 5/1995 | James |
| 5,504,683 A | 4/1996 | Gurmu |
| 5,625,559 A | 4/1997 | Egawa |
| 5,732,785 A | 3/1998 | Ran et al. |
| 6,028,537 A | 2/2000 | Suman et al. |
| 6,064,318 A | 5/2000 | Kirchner, III et al. |
| 6,317,682 B1 | 11/2001 | Ogura et al. |
| 6,754,678 B2 | 6/2004 | Norris et al. |
| 6,829,531 B2 | 12/2004 | Lee |
| 6,900,740 B2 | 5/2005 | Bloomquist et al. |
| 7,295,904 B2 | 11/2007 | Kanevsky et al. |
| 7,324,893 B2 | 1/2008 | Yamashita et al. |
| 7,343,243 B2 | 3/2008 | Smith |
| 7,382,274 B1 | 6/2008 | Kermani et al. |
| 7,418,346 B2 | 8/2008 | Breed et al. |
| 7,421,334 B2 | 9/2008 | Dahlgren et al. |
| 7,425,903 B2 | 9/2008 | Boss et al. |
| 7,554,435 B2 | 6/2009 | Tengler et al. |
| 7,725,249 B2 | 5/2010 | Kickbusch |
| 7,860,639 B2 | 12/2010 | Yang |
| 7,894,951 B2 | 2/2011 | Norris et al. |
| 7,979,172 B2 | 7/2011 | Breed |
| 8,352,112 B2 | 1/2013 | Mudalige |
| 8,527,139 B1 | 9/2013 | Yousuf |
| 8,589,070 B2 | 11/2013 | Ban |
| 8,630,795 B2 | 1/2014 | Breed et al. |
| 8,682,511 B2 | 3/2014 | Andreasson |
| 8,972,080 B2 | 3/2015 | Shida et al. |
| 9,053,636 B2 | 6/2015 | Gordon |
| 9,076,332 B2 | 7/2015 | Myr |
| 9,120,485 B1 | 9/2015 | Dolgov |

| | | | |
|---|---|---|---|
| 9,147,298 B2 | 9/2015 | Ricci et al. |
| 9,182,951 B1 | 11/2015 | Ormerod et al. |
| 9,349,055 B1 | 5/2016 | Ogale |
| 9,494,935 B2 | 11/2016 | Okumura et al. |
| 9,495,874 B1 | 11/2016 | Zhu et al. |
| 9,581,997 B1 | 2/2017 | Penilia et al. |
| 9,595,190 B2 | 3/2017 | Mccrary |
| 9,646,496 B1 | 5/2017 | Miller et al. |
| 9,654,511 B1 | 5/2017 | Brocco et al. |
| 9,665,101 B1 | 5/2017 | Templeton |
| 9,731,713 B2 | 8/2017 | Horii |
| 9,799,224 B2 | 10/2017 | Okamoto |
| 9,845,096 B2 | 12/2017 | Urano et al. |
| 9,915,950 B2 | 3/2018 | Hartung et al. |
| 9,940,840 B1 | 4/2018 | Schubert et al. |
| 9,958,864 B2 | 5/2018 | Kentley-Klay et al. |
| 9,964,948 B2 | 5/2018 | Ullrich et al. |
| 10,074,223 B2 | 9/2018 | Newman |
| 10,074,273 B2 | 9/2018 | Yokoyama et al. |
| 10,380,886 B2 | 8/2019 | Ran et al. |
| 2002/0008637 A1 | 1/2002 | Lemelson et al. |
| 2003/0045995 A1 | 3/2003 | Lee |
| 2003/0061017 A1 | 3/2003 | Dotaro et al. |
| 2004/0145496 A1 | 7/2004 | Ellis |
| 2004/0230393 A1 | 11/2004 | Tzamaloukas |
| 2005/0060069 A1 | 3/2005 | Breed et al. |
| 2005/0102098 A1 | 5/2005 | Montealegre et al. |
| 2005/0209769 A1 | 9/2005 | Yamashita et al. |
| 2005/0222760 A1 | 10/2005 | Cabral et al. |
| 2006/0142933 A1 | 6/2006 | Feng |
| 2006/0226968 A1 | 10/2006 | Tengler et al. |
| 2006/0251498 A1 | 11/2006 | Buzzoni et al. |
| 2007/0093997 A1 | 4/2007 | Yang et al. |
| 2007/0146162 A1 | 6/2007 | Tengler et al. |
| 2008/0042815 A1 | 2/2008 | Breed et al. |
| 2008/0095163 A1 | 4/2008 | Chen et al. |
| 2008/0150786 A1 | 6/2008 | Breed |
| 2008/0161986 A1 | 7/2008 | Breed et al. |
| 2008/0161987 A1 | 7/2008 | Breed |
| 2008/0275646 A1 | 11/2008 | Perng et al. |
| 2010/0013629 A1 | 1/2010 | Sznaider et al. |
| 2010/0256836 A1 | 10/2010 | Mudalige et al. |
| 2011/0012755 A1 | 1/2011 | Mudalige et al. |
| 2011/0224892 A1 | 9/2011 | Speiser |
| 2011/0227757 A1 | 9/2011 | Chen et al. |
| 2012/0017262 A1 | 1/2012 | Kapoor et al. |
| 2012/0022776 A1 | 1/2012 | Razavilar et al. |
| 2012/0059574 A1 | 3/2012 | Hada |
| 2012/0105639 A1 | 5/2012 | Stein et al. |
| 2012/0143786 A1 | 6/2012 | Karner |
| 2012/0283910 A1 | 11/2012 | Lee et al. |
| 2012/0303807 A1 | 11/2012 | Akelbein et al. |
| 2013/0116915 A1 | 5/2013 | Ferreira et al. |
| 2013/0133026 A1 | 5/2013 | Brugess et al. |
| 2013/0137457 A1 | 5/2013 | Potkonjak |
| 2013/0138714 A1 | 5/2013 | Ricci |
| 2013/0141580 A1 | 6/2013 | Stein et al. |
| 2013/0201316 A1 | 8/2013 | Binder et al. |
| 2013/0204484 A1 | 8/2013 | Ricci |
| 2013/0218412 A1 | 8/2013 | Ricci |
| 2013/0297140 A1 | 11/2013 | Montemerlo et al. |
| 2013/0297196 A1 | 11/2013 | Shida |
| 2014/0112410 A1 | 4/2014 | Yokoyama |
| 2014/0219505 A1 | 8/2014 | Kindo et al. |
| 2014/0222322 A1 | 8/2014 | Durekovic |
| 2014/0278026 A1 | 9/2014 | Taylor |
| 2014/0278052 A1 | 9/2014 | Slavin et al. |
| 2014/0354451 A1 | 12/2014 | Tonguz et al. |
| 2015/0153013 A1 | 6/2015 | Zhao et al. |
| 2015/0169018 A1 | 6/2015 | Rogo et al. |
| 2015/0197247 A1 | 7/2015 | Ichinokawa |
| 2015/0199685 A1 | 7/2015 | Betancourt et al. |
| 2015/0211868 A1 | 7/2015 | Matsushita et al. |
| 2015/0310742 A1 | 10/2015 | Albornoz |
| 2016/0042303 A1 | 2/2016 | Medina et al. |
| 2016/0086391 A1 | 3/2016 | Ricci |
| 2016/0110820 A1 | 4/2016 | Fleck et al. |
| 2016/0132705 A1 | 5/2016 | Kovarik et al. |
| 2016/0142492 A1 | 5/2016 | Fang et al. |

(56) References Cited

U.S. PATENT DOCUMENTS

| | | | |
|---|---|---|---|
| 2016/0148440 A1 | 5/2016 | Kwak |
| 2016/0216130 A1 | 7/2016 | Abramson et al. |
| 2016/0221186 A1 | 8/2016 | Perrone |
| 2016/0231746 A1 | 8/2016 | Hazelton et al. |
| 2016/0238703 A1 | 8/2016 | Liu et al. |
| 2016/0325753 A1 | 11/2016 | Stein et al. |
| 2016/0328272 A1 | 11/2016 | Ahmed et al. |
| 2016/0330036 A1 | 11/2016 | Zhou et al. |
| 2016/0370194 A1 | 12/2016 | Colijn et al. |
| 2017/0026893 A1 | 1/2017 | Lagassey |
| 2017/0039435 A1 | 2/2017 | Ogale et al. |
| 2017/0046883 A1 | 2/2017 | Gordon et al. |
| 2017/0053529 A1 | 2/2017 | Yokoyama et al. |
| 2017/0059342 A1 | 3/2017 | Rajendran et al. |
| 2017/0075195 A1 | 3/2017 | Stein et al. |
| 2017/0085632 A1 | 3/2017 | Cardote |
| 2017/0090994 A1 | 3/2017 | Jubinski et al. |
| 2017/0109644 A1 | 4/2017 | Nariyambut Murali et al. |
| 2017/0131435 A1 | 5/2017 | Peacock et al. |
| 2017/0169528 A1 | 6/2017 | Kundu et al. |
| 2017/0206783 A1 | 7/2017 | Miller |
| 2017/0262790 A1 | 9/2017 | Khasis |
| 2017/0276492 A1 | 9/2017 | Ramasamy |
| 2017/0324817 A1 | 11/2017 | Oliveira et al. |
| 2017/0337571 A1 | 11/2017 | Bansal et al. |
| 2017/0339224 A1 | 11/2017 | Condeixa et al. |
| 2017/0357980 A1 | 12/2017 | Bakun et al. |
| 2018/0018216 A1 | 1/2018 | Halford et al. |
| 2018/0053413 A1 | 2/2018 | Patil et al. |
| 2018/0065637 A1 | 3/2018 | Bassindale |
| 2018/0082683 A1 | 3/2018 | Chen et al. |
| 2018/0114079 A1 | 4/2018 | Myers et al. |
| 2018/0122237 A1 | 5/2018 | Nascimento et al. |
| 2018/0149488 A1 | 5/2018 | Suto et al. |
| 2018/0151064 A1 | 5/2018 | Xu et al. |
| 2018/0158327 A1 | 6/2018 | Gärtner et al. |
| 2018/0164822 A1 | 6/2018 | Chu et al. |
| 2018/0190116 A1 | 7/2018 | Bauer et al. |
| 2018/0262887 A1 | 9/2018 | Futaki |
| 2018/0299274 A1 | 10/2018 | Moghe et al. |
| 2018/0308344 A1 | 10/2018 | Ravindranath et al. |
| 2018/0336780 A1 | 11/2018 | Ran et al. |
| 2019/0096238 A1 | 3/2019 | Ran et al. |
| 2019/0110174 A1 | 4/2019 | Way et al. |
| 2019/0207969 A1 | 7/2019 | Brown et al. |
| 2019/0244518 A1 | 8/2019 | Cheng et al. |
| 2019/0244521 A1 | 8/2019 | Ran et al. |
| 2019/0260804 A1 | 8/2019 | Beck et al. |
| 2019/0392152 A1 | 12/2019 | Patel et al. |
| 2020/0134671 A1 | 4/2020 | Maccini et al. |

FOREIGN PATENT DOCUMENTS

| | | | | |
|---|---|---|---|---|
| CN | 104485003 B | | 4/2015 | |
| CN | 105528498 | * | 4/2016 | ............ G06Q 10/04 |
| CN | 106710203 A | | 5/2017 | |
| CN | 107665578 A | | 2/2018 | |
| CN | 107807633 A | | 3/2018 | |
| CN | 108039053 A | | 5/2018 | |
| CN | 108447291 A | | 8/2018 | |
| EP | 2395472 A1 | | 12/2011 | |
| KR | 20170008703 A | | 1/2017 | |
| WO | WO 2016/077027 A1 | | 5/2016 | |
| WO | WO 2016/135561 A1 | | 5/2016 | |
| WO | WO 2015/114592 A1 | | 9/2016 | |
| WO | WO 2017/049978 A1 | | 3/2017 | |
| WO | WO 2017/079474 A2 | | 5/2017 | |
| WO | WO 2017/115342 A1 | | 7/2017 | |
| WO | WO 2017/160276 A1 | | 3/2018 | |
| WO | WO 2018/039134 A1 | | 3/2018 | |
| WO | WO 2018/132378 | | 7/2018 | |
| WO | WO 2019/156955 A1 | | 8/2019 | |
| WO | WO 2019/156956 A1 | | 8/2019 | |

OTHER PUBLICATIONS

S. Severi, h. Wymeersch, J. Harri, M. Ulmschneider, B. Denis and M. Bartels, "Beyond GNSS: Highly accurate localization for cooperative-intelligent transport systems," 2018 IEEE Wireless Communications and Networking Conference (WCNC), Barcelona, Spain, 2018, pp. 1-6. (Year: 2018).*

A. Celesti, A. Galletta, L. Carnevale, M. Fazio, A. Lay-Ekuakille and M. Villari, "An IoT Cloud System for Traffic Monitoring and Vehicular Accidents Prevention Based on Mobile Sensor Data Processing," in IEEE Sensors Journal, vol. 18, No. 12, pp. 4795-4802 , 15 Jun. 15, 2018. (Year: 2018).*

English translation of CN105528498 (Year: 2016).*

Abdelhamid, Sherin, et al. "Vehicle as a resource (VaaR);" IEEE Network (vol. 29, Issue: 1, pp. 12-17) (Year: 2015).

Al-Najada et al., "Autonomous vehicles safe-optimal trajectory selection based on big data analysis and predefined user preferences," 2016 IEEE 7th Annual Ubiquitous Computing, Electronics & Mobile Communication Conference (UEMCON), New York, NY, 2016, pp. 1-6.

APGDT002, Microchip Technology Inc. http://www.microchip.com/, retrieved on: Nov. 3, 2017, 2 pages.

Bergenhem et al. "Overview of Platooning Systems", ITS World Congress, Vienna, Oct. 22-26, 2012, 8 pages.

Bhat "Travel Modeling in an Era of Connected and Automated Transportation Systems: An Investigation in the Dallas-Fort Worth Area," Techinal Report 122, Center for Transportation Research, Feb. 2017 [retrieved on Sep. 3, 2019]. Retrieved from the Internet: <URL:http://www.caee.utexas.edu/prof/bhat/REPORTS/DSTOP_122.pdf> pp. 1-61.

Conduent™—Toll Collection Solutions, https://www.conduent.com/solution/transportation-solutions/electronic-toll-collection/, retrived on: Nov. 3, 2017, 3 pages.

Doshi Review of the book "Security for Cloud Storage Systems" Mefhi, Gauridad Campus, India, 2014, pp. 1-2 [retrieved on Sep. 5, 2019]. Retrieved from the Internet: <URL:https://www.iacr.org/books/2014_sp_yang_cloudstorage.pdf.

EyEQ4 from Mobileye, http://www.mobileye.com/our-technology, retrieved on Nov. 3, 2017, 6 pages.

Fehr-Peers "Effects of Next Generation Vehicles on Travel Demand and Highway, Capacity," FP Think: Effects of Next-Generation Vehicles on Travel Demand and Highway Capacity Feb. 2014, [retrieved on Jun. 13, 2019]. Retrieved from the Internet: <URL:http://www.fehrandpeers.com/wp-content/uploads/2015/07/FP_Thing_Next_Gen_White_Paper_FINAL.pdf>pp. 1-39.

Flammini et al. "Wireless sensor networking in the internet of things and cloud computing era." Procedia Engineering 87 (2014): 672-679.

Fleetmatics https://www.fleetmatics.com/, retrieved on: Nov. 3, 2017, 6 pages.

HDL-64E of Velodyne Lidar, http://velodynelidar.com/index.html, retrieved on: Nov. 3, 2017, 10 pages.

Here, https://here.com/en/products-services/products/here-hd-live-map, retrieved on: Nov. 3, 2017, 5 pages.

International Search Report of related PCT/US2019/039376, mailed Oct. 29, 2019, 11 pages.

Johri et al.,"A Multi-Scale Spatiotemporal Perspective of Connected and Automated Vehicles: Applications and Wireless Networking," in IEEE Intelligent Transportation Systems Magazine, vol. 8, No. 2, pp. 65-73, Summer 2016.

Maaß et al., "Data Processing of High-rate low-voltage Distribution Grid Recordings for Smart Grid Monitoring and Analysis," EURASIP Journal on Advances in Signal Processing (2015) 2015:14 DOI 10.1186/s13634-015-02034[retrieved on Sep. 3, 2019]. Retrieved from the Internet: <URL:https://link.springer.com/content/pdf/10.1186%2Fs13634-015-0203-4.pdf> pp. 1-21.

Miami Dade Transportation Planning Organization "First Mile-Last Mile Options with High Trip Generator Employers." MiamiDadeTPO.org. pp. 1-99 Jan. 31, 2018, [retrieved on Jun. 13, 2019]. Retrieved from the Internet:<URL:http://www.miamidadetpo.org/library/studies/first-mile-last-mile-options-with-high-trip-generator-employers-2017-12.pdf>.

(56)         References Cited

OTHER PUBLICATIONS

MK5 V2X ,Cohda Wireless,http://cohdawireless.com, retrieved on: Nov. 3, 2017, 2 pages.

National Association of City Transportation Officials. "Blueprint for Autonomous Urbanism". New York, NY 10017, www.nacto.org, Fall 2017, [retrieved on Sep. 5, 2019]. Retrieved from the Internet: <URL:https://nacto.org/wp-content/uploads/2017/11/BAU_Mod1_raster-sm.pdf>.

Optical Fiber from Cablesys, https://www.cablesys.com/fiber-patch-cables/?gclid=Cj0KEQjwldzHBRCfg_almKrf7N4BEiQABJTPKH_q2wbjNLGBhBVQVSBogLQMkDaQdMm5rZtyBaE8uuUaAhTJ8P8HAQ, retrieved on: Nov. 3, 2017, 10 pages.

Portland "Portland Metro Area Value Pricing Feasibility Analysis" Oregon Department of Transportation, Jan. 23, 2018, pp. 1-29, [retrieved on Jun. 13, 2019]. Retrived from the Internet: <URL:https://www.oregon.gov/ODOT/KOM/VP-TM2-InitialConcepts.PDF>.

Products for Toll Collection—Mobility—Siemens—Siemens, https://www.mobility.siemens.com/mobility/global/en/urban-mobility/road-solutions/toll-systems-for-cities/products-for-toll-collection/pages/products-for-toll-collection.aspx, retrieved on: Nov. 3, 2017, 2 pages.

R-Fans_16 from Beijing Surestar Technology Co. Ltd, http://www.isurestar.com/index.php/en-product-product.html#9, retrieved on: Nov. 3, 2017, 7 pages.

Society of Automotive Engineers International's new standard J3016: "(R) Taxonomy and Definitions for Terms Related to Driving Automation Systems for On-Road Motor Vehicles" 2016, downloaded Dec. 12, 2016, 30 pages.

Society of Automotive Engineers International's new standard J3016: "Taxonomy and Definitions for Terms Related to On-Road Motor Vehicle Automated Driving Systems" 2014, downloaded Sep. 17, 2019, 12 pages.

Southwest Research Institute, Basic Infrastructure Message Development and Standards Support for Connected Vehicles Applications, Apr. 24, 2018. {retrieved on Sep. 3, 2019}. Retrieved from the Internet: <URL:http://www.cts.virginia.edu/wp-content/uploads/2018/12/Task4-Basic-Infrastructure-Message-Development-20180425-Final.pdf> pp. 1-76.

STJ1-3 from Sensortech, http://www.whsensortech.com/, retrieved on Nov. 3, 2017, 2 pages.

StreetWAVE from Savari, http://savari.net/technology/road-side-unit, retrieved on: Nov. 3, 2017, 2 pages.

Surakitbanharn "Connected and Autonomous Vehicles: A Policy Review" Purdue Policy Research Institute, Feb. 2018, retrieved on Sep. 3, 2019, retrived from the interned: <URL:https://www.purdue.edu/discoverypark/ppri/docs/CATV%20Policy%20Writeup%20Feb%202018.pdf> pp. 1-17.

TDC-GPX2 LIDAR of precision-measurement-technologies, http://pmt fl.com, retrieved on: Nov. 3, 2017, 2 pages.

Teletrac Navman http://drive.teletracnavman.com/, retrieved on: Nov. 3, 2017, 2 pages.

Vector CANalyzer9.0 from vector https://vector.com, retrieved on Nov. 3, 2017, 1 page.

Williams "Transportation Planning Implications of Automated/Connected Vehicles on Texas Highways" Texas A&M Transportation Institute, Apr. 2017, 34 pages.

* cited by examiner

FIG. 2B

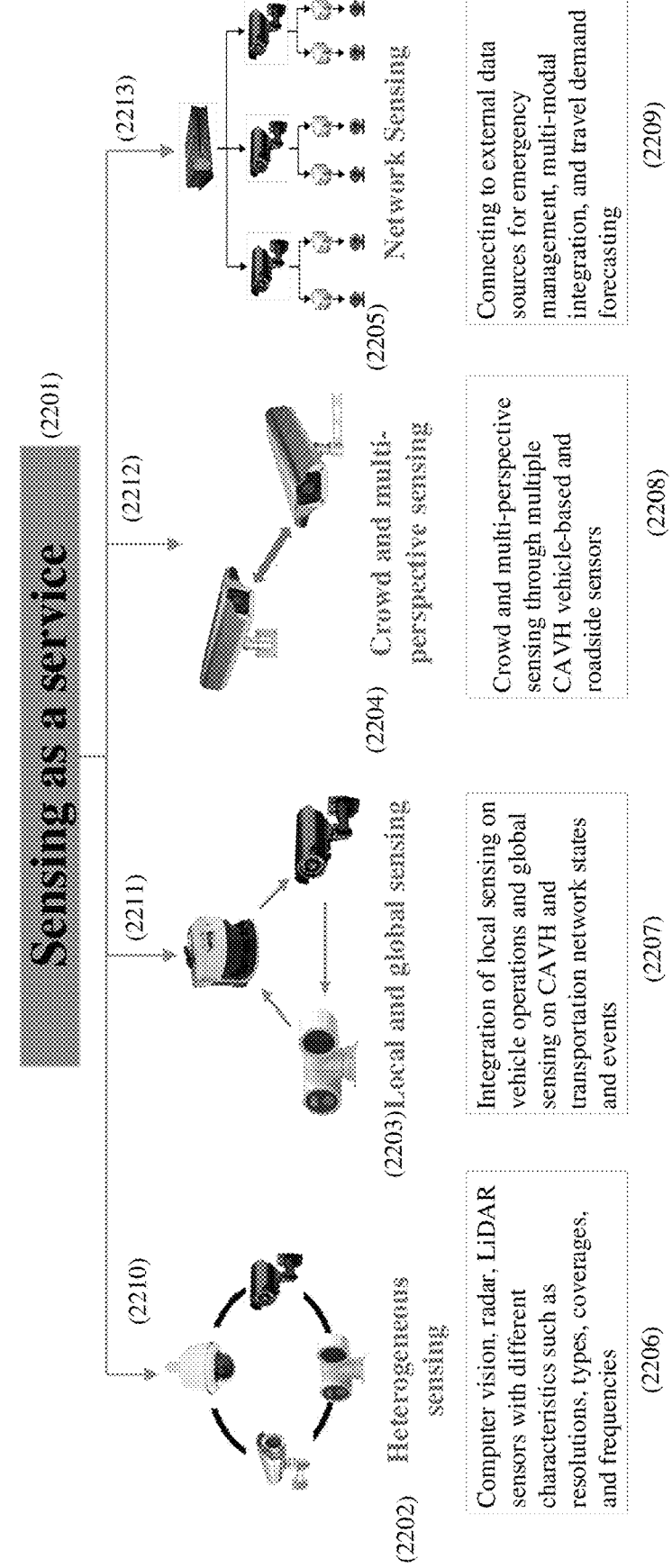

Sensing as a service (2201)

(2213)

Network Sensing (2205)

(2212)

(2204) Crowd and multi-perspective sensing (2211)

(2203) Local and global sensing (2210)

(2202) Heterogeneous sensing

Computer vision, radar, LiDAR sensors with different characteristics such as resolutions, types, coverages, and frequencies (2206)

Integration of local sensing on vehicle operations and global sensing on CAVH and transportation network states and events (2207)

Crowd and multi-perspective sensing through multiple CAVH vehicle-based and roadside sensors (2208)

Connecting to external data sources for emergency management, multi-modal integration, and travel demand forecasting (2209)

FIG. 2C

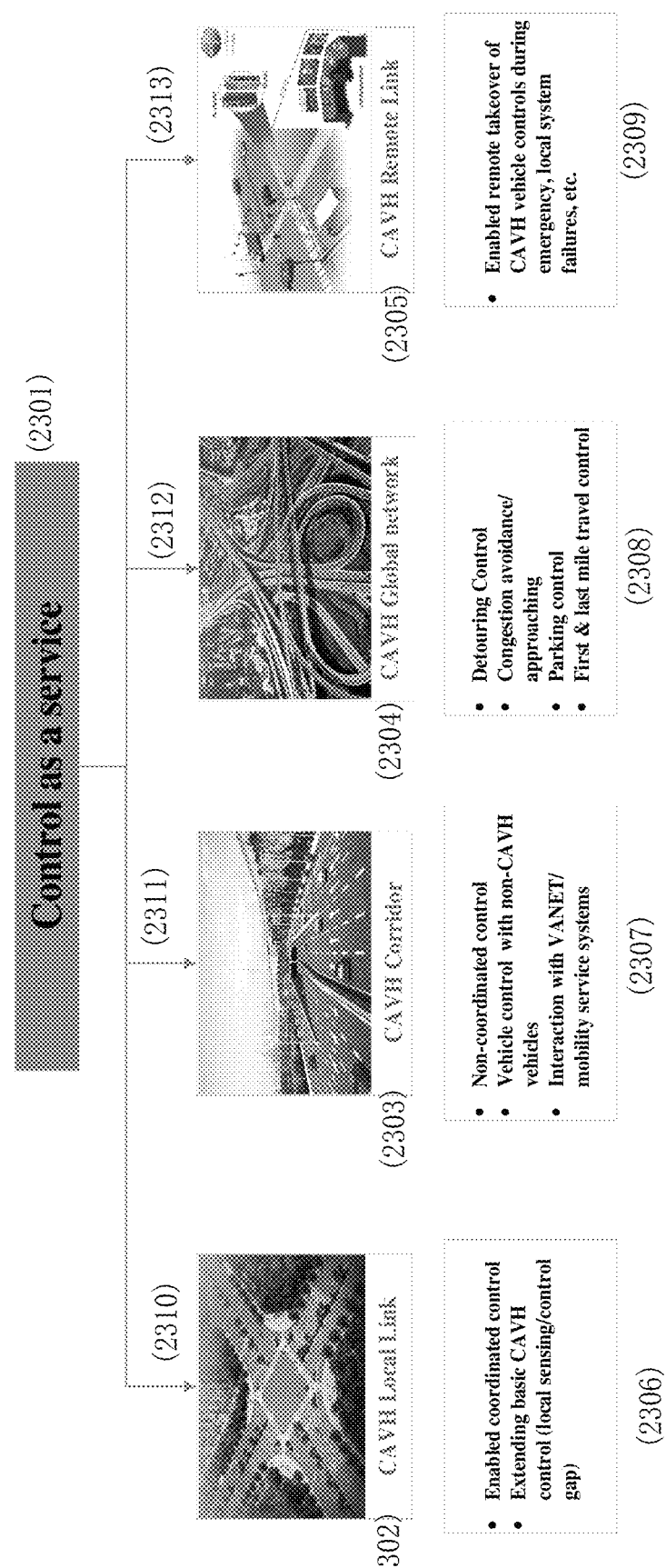

(2301) Control as a service (2310)

(2311)

(2312)

(2313)

(2302) CAVH Local Link (2303) CAVH Corridor (2304) CAVH Global Network (2305) CAVH Remote Link (2306)
- Enabled coordinated control
- Extending basic CAVH control (local sensing/control gap)

(2307)
- Non-coordinated control
- Vehicle control with non-CAVH vehicles
- Interaction with VANET/ mobility service systems (2308)
- Detouring Control
- Congestion avoidance/ approaching
- Parking control
- First & last mile travel control (2309)
- Enabled remote takeover of CAVH vehicle controls during emergency, local system failures, etc.

FIG. 2D

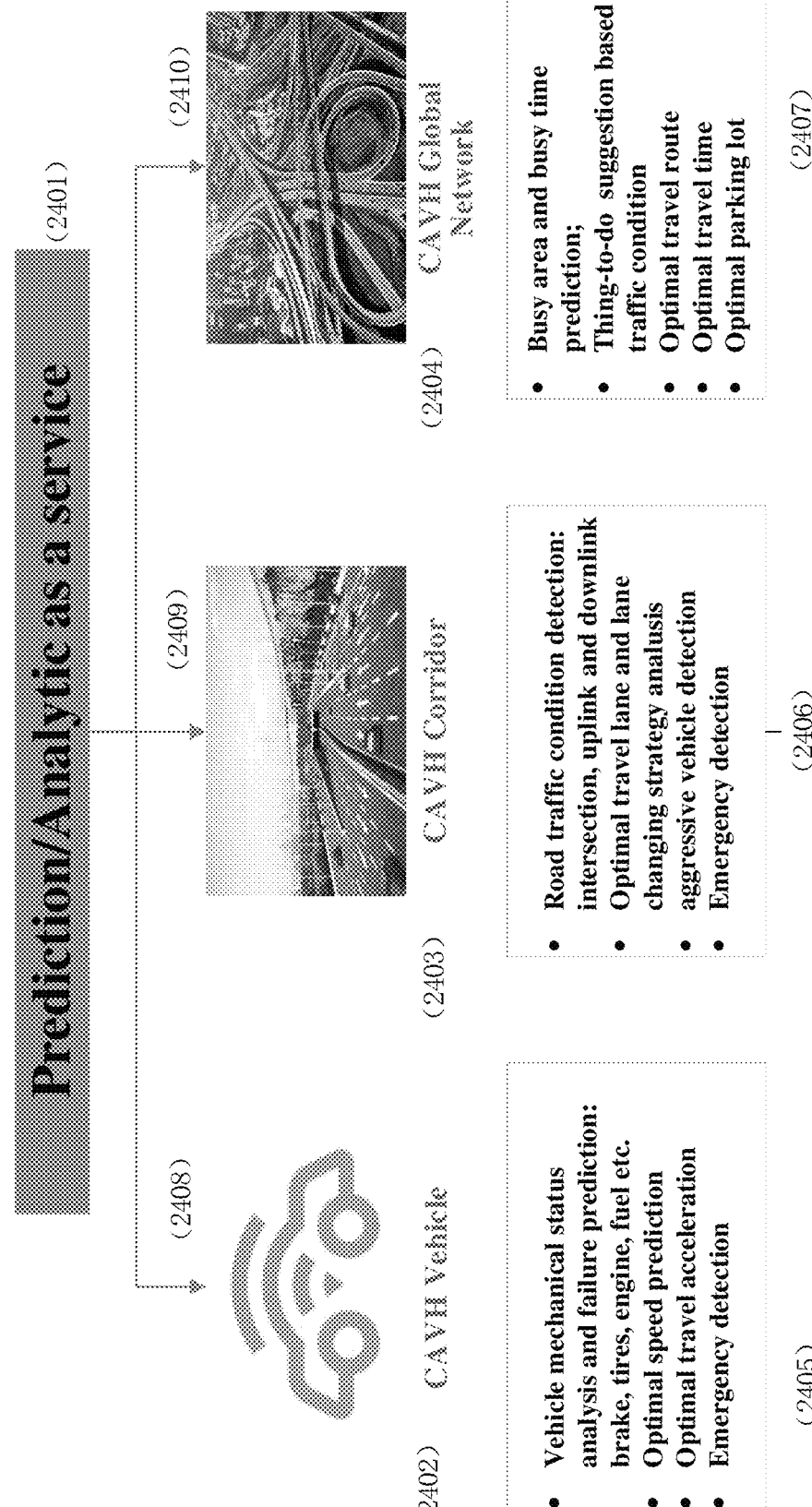

Prediction/Analytic as a service (2401)

(2408)

(2409)

(2410)

(2402)    CAVH Vehicle (2403)    CAVH Corridor (2404)    CAVH Global Network

- Vehicle mechanical status analysis and failure prediction: brake, tires, engine, fuel etc.
- Optimal speed prediction
- Optimal travel acceleration
- Emergency detection (2405)

- Road traffic condition detection: intersection, uplink and downlink
- Optimal travel lane and lane changing strategy analusis
- aggressive vehicle detection
- Emergency detection (2406)

- Busy area and busy time prediction;
- Thing-to-do suggestion based on traffic condition
- Optimal travel route
- Optimal travel time
- Optimal parking lot (2407)

FIG. 2E

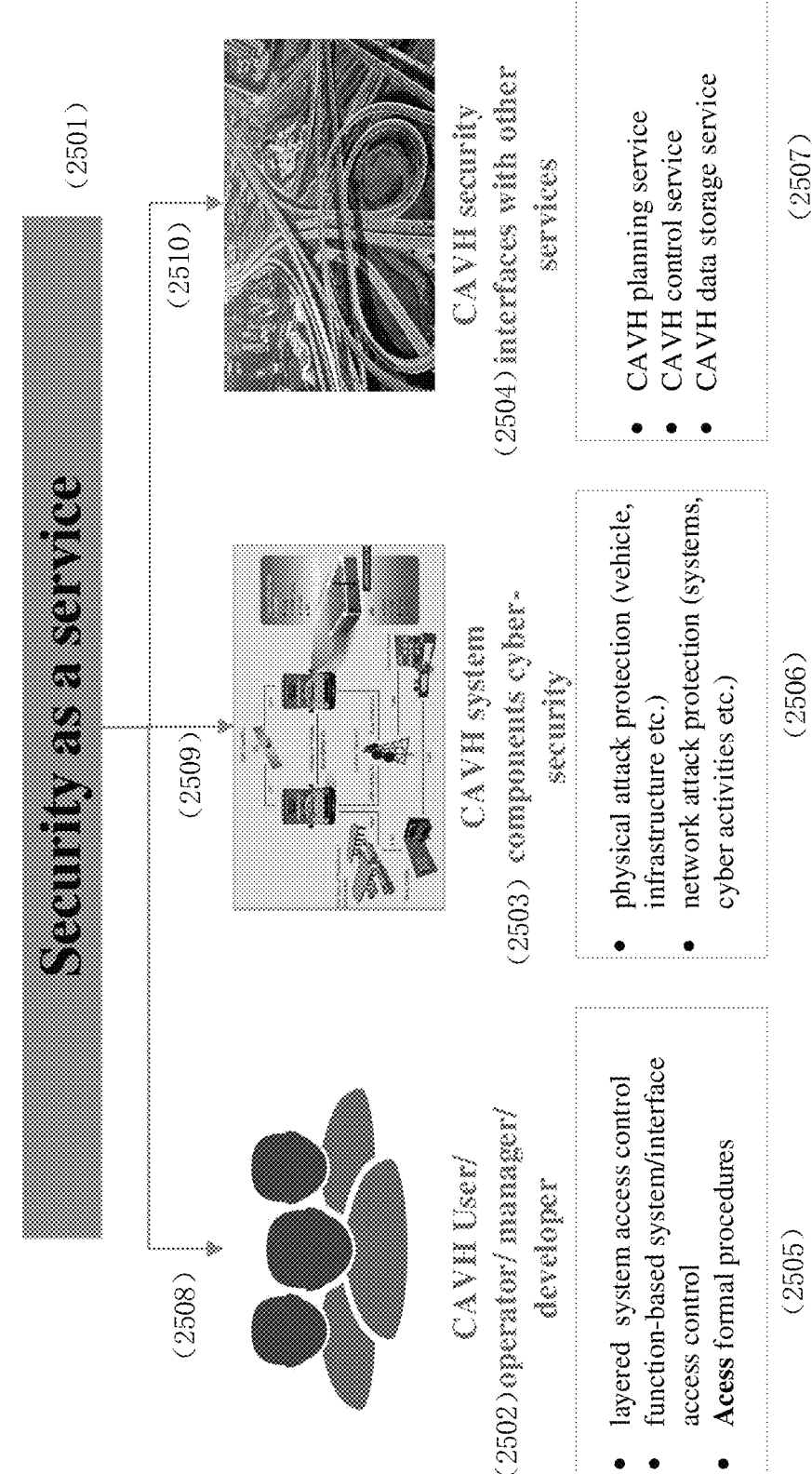

Security as a service (2501)

(2510)

CAVH security
(2504) interfaces with other services

- CAVH planning service
- CAVH control service
- CAVH data storage service (2507)

(2509)

CAVH system
(2503) components cyber-security

- physical attack protection (vehicle, infrastructure etc.)
- network attack protection (systems, cyber activities etc.)

(2506)

(2508)

CAVH User/
(2502) operator/ manager/ developer

- layered system access control
- function-based system/interface access control
- Acess formal procedures

(2505)

Privacy as a service （2601）

（2610）

（2608）

（2609）

（2602）CAVH User

（2603）   CAVH Vehicle

（2604）  CAVH local and global data

- user profile
- user preference
- user transaction records

（2605）

- travel trajectory,
- trip OD
- travel schedule

（2606）

- data collection
- data storage
- leveled data access control

（2607）

(2701)

Storage as a service (2710)

(2709)

(2708)

(2704) CAVH long-term data

- historical recurrent, non-recurrent congestion control patterns
- user profiles
- CAVH vehicle/OBU/RSC status (2707)

(2703) CAVH short-term data (1hr)-(1-7day) event data:
- traffic crash data
- network congestion pattern
- road construction (2706)

(2702) CAVH real-time data

- real time sensing data
- real-time control data
- real time communication information (2705)

FIG. 7

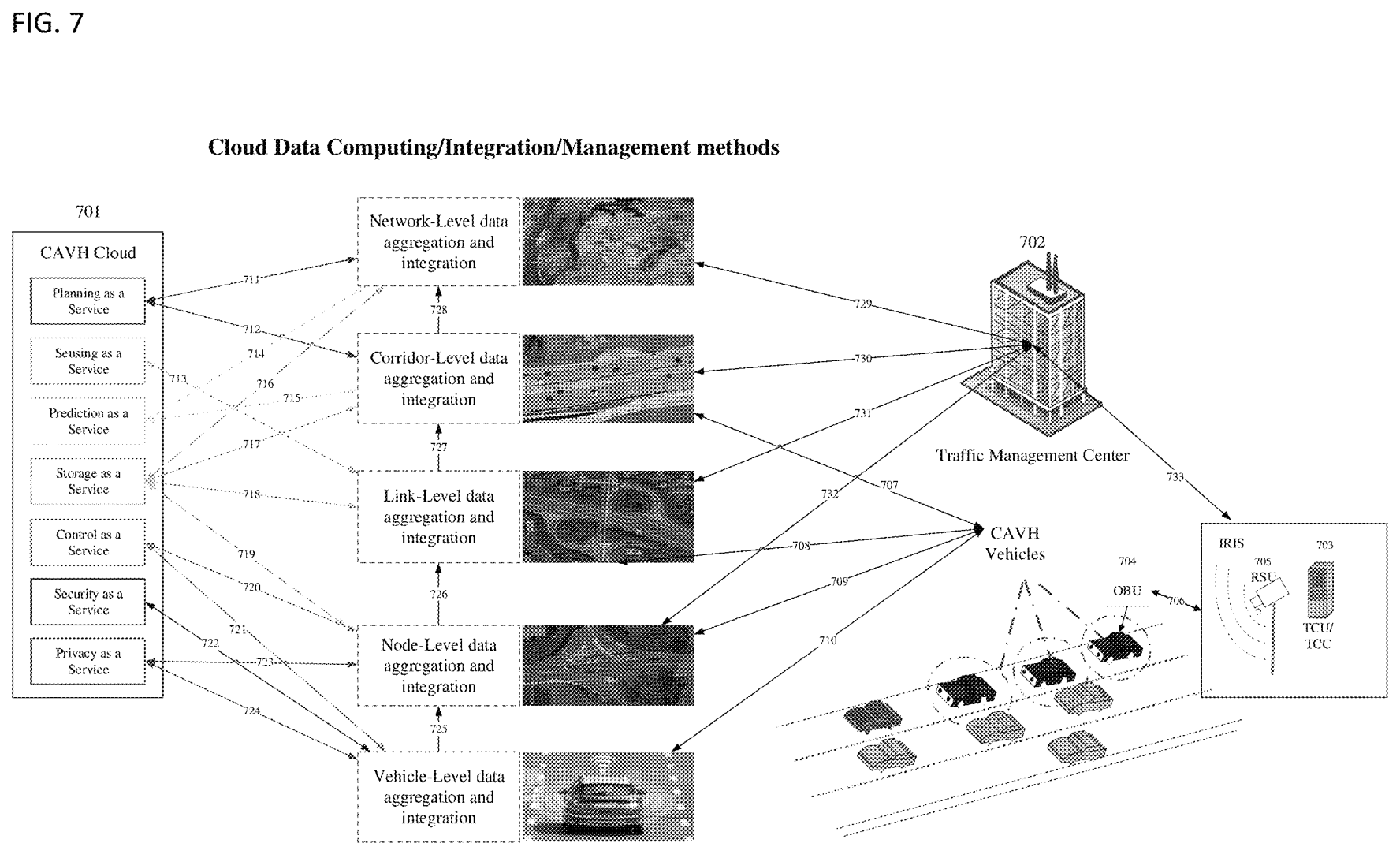

Cloud Data Computing/Integration/Management methods

IRIS

703
TCU/
TCC

705
RSU

706
OBU
704

Traffic Management Center

CAVH
Vehicles

702

701

CAVH Cloud

Planning as a Service
Sensing as a Service
Prediction as a Service
Storage as a Service
Control as a Service
Security as a Service
Privacy as a Service Network-Level data aggregation and integration Corridor-Level data aggregation and integration Link-Level data aggregation and integration Node-Level data aggregation and integration Vehicle-Level data aggregation and integration

CLOUD-BASED MODEL DEPLOYMENT AND CONTROL SYSTEM (CMDCS) FOR PROVIDING AUTOMATED DRIVING SERVICES

STATEMENT OF RELATED APPLICATIONS

This application is a continuation of U.S. patent application Ser. No. 16/454,268, filed Jun. 27, 2019, now U.S. Pat. No. 12,057,011, issued Aug. 6, 2024, which claims the benefit of U.S. provisional patent application Ser. No. 62/691,391, filed Jun. 28, 2018, the entire contents of which are incorporated herein by reference for all purposes.

FIELD

Provided herein is technology relating to a cloud-based system for a connected and automated vehicle highway (CAVH) system. In some embodiments, the CAVH cloud services and their interactions with CAVH system components provide a range of system functionalities including but not limited to connectivity, sensing, control, planning, maintenance, security, and privacy protection.

BACKGROUND

CAVH systems comprise components including, but not limited to, users, vehicles, roadside CAVH, and CAVH multi-layered control systems. Systems and methods that provide connectivity, efficiency, mobility, safety, integrity, security, and privacy protection of CAVH systems are needed. Provided herein are systems and methods that provide and connect CAVH system functionalities to facilitate such benefits.

SUMMARY

Provided herein is technology relating to a cloud-based system for a connected and automated vehicle highway (CAVH) system. In some embodiments, the CAVH cloud services and their interactions with CAVH system components provide a range of system functionalities including but not limited to connectivity, sensing, control, planning, maintenance, security, and privacy protection. In some embodiments, the technology comprises a connected automated vehicle highway system (referred to herein as a CAVH system) and methods and/or components thereof as described in U.S. patent application Ser. No. 15/628,331, filed Jun. 20, 2017; and U.S. Provisional Patent Application Ser. Nos. 62/626,862, filed Feb. 6, 2018; 62/627,005, filed Feb. 6, 2018; 62/655,651, filed Apr. 10, 2018; and 62/669,215, filed May 9, 2018, the disclosure of each of which is herein incorporated by reference in its entirety.

In some embodiments, the present technology provides a CAVH cloud system design to provide sensing, prediction, control, prediction, storage, control, security, and/or privacy as services. In some embodiments, each service interacts with other CAVH system components, e.g., at the user end, the vehicle end, the CAVH infrastructure end, and/or the transportation infrastructure end. In some embodiments, the CAVH cloud technologies provide analytic and optimization methods, cloud computing methods, security methods, and privacy protection methods. In some embodiments, each method serves and/or interacts with one or more CAVH services.

Accordingly, in some embodiments the technology provides a cloud-based CAVH service system comprising: a user component, a vehicle component, an infrastructure component, a network component, and/or a computing component. In some embodiments, the cloud-based CAVH service system is configured to provide communication, operations, information exchange, control, security, and/or privacy protection for a CAVH system. In some embodiments, the cloud-based CAVH service system comprises a planning as a service sub-system, a privacy as a service sub-system, a security as a service sub-system, a connectivity as a service sub-system, a control as a service sub-system, a storage as a service sub-system, a prediction as a service sub-system, and/or a sensing as a service sub-system. In some embodiments, the cloud-based CAVH service system is configured to provide one or more cloud-based methods for CAVH control. In some embodiments, the cloud-based CAVH service system is configured to provide one or more cloud-based methods for cloud delivery, communication, data computing and management, analytics and optimization, onsite and remote control, and/or privacy and security.

In some embodiments, the cloud-based service system comprises a Planning as a Service sub-system. In some embodiments, the Planning as a Service sub-system is configured to provide cloud-computing based methods for CAVH operational planning. In some embodiments, the cloud-computing based methods for CAVH operational planning comprise user activity planning methods. In some embodiments, the user activity planning methods comprise receiving and/or providing data characterizing a routing and/or transportation mode. In some embodiments, the routing data comprise information related to toll roads (e.g., location, entrance point, exit point, cost, condition, traffic load). In some embodiments, routing data comprise information related to transit time. In some embodiments, cloud-computing based methods for CAVH operational planning comprise vehicle operational planning methods. In some embodiments, vehicle operational planning methods comprise receiving and/or providing data characterizing departure time, origin, destination, and/or route. In some embodiments, vehicle operational planning methods comprise receiving and/or providing data characterizing vehicle dispatching, vehicle security, and/or emergency planning. In some embodiments, cloud-computing based methods for CAVH operational planning comprise infrastructure activity planning methods. In some embodiments, infrastructure activity planning methods comprise methods for automated driving and/or CAVH route and network planning. In some embodiments, cloud-computing based methods for CAVH operational planning comprise system operational planning methods. In some embodiments, system operational planning methods comprise managing CAVH sub-system connection and cooperation and/or managing data flow and/or communication.

In some embodiments, the system comprises a Sensing as a Service sub-system. In some embodiments, the Sensing as a Service sub-system comprises cloud-computing based sensing methods. In some embodiments, the cloud-computing based sensing methods comprise managing crowd and multi-perspective sensing through multiple CAVH vehicle-based and roadside sensors. In some embodiments, the cloud-computing based sensing methods comprise local and global sensing methods. In some embodiments, the local and global sensing methods comprise integrating local sensing data characterizing vehicle operations and global sensing data characterizing CAVH and transportation network states and events. In some embodiments, the cloud-computing based sensing methods comprise heterogeneous sensing methods. In some embodiments, the heterogeneous sensing methods comprise receiving data from a sensor that is computer vision, radar, and/or LiDAR. In some embodiments, the sensor provides data having a resolution, type, coverage, and/or frequency. In some embodiments, various sensors provide data over a varying range of resolution, type, coverage, and/or frequency. In some embodiments, the cloud-computing based sensing methods comprise network sensing methods. In some embodiments, the network sensing methods comprise communicating with external data sources for emergency management, integrating multiple transportation modes, and/or forecasting travel demand.

In some embodiments, the system comprises a Control as a Service sub-system. In some embodiments, the Control as a Service sub-system comprises cloud-computing methods for CAVH vehicular control. In some embodiments, the cloud-computing methods for CAVH vehicular control comprise methods for vehicle operational control. In some embodiments, the methods for vehicle operational control comprise receiving and/or providing data characterizing vehicle speed, direction, map coordinate, and/or spacing relative to other vehicles. In some embodiments, the cloud-computing methods for CAVH vehicular control comprise methods for corridor activity control. In some embodiments, the methods for corridor activity control comprise managing automated driving, merging with non-CAV vehicles, and/or interacting with a vehicular ad hoc network (VANET) service. In some embodiments, the cloud-computing methods for CAVH vehicular control comprise methods for global activity control. In some embodiments, the methods for global activity control comprise receiving and/or providing data characterizing routes, detour, parking, traffic load, congestion; and/or managing first and/or last mile control of vehicles. In some embodiments, the cloud-computing methods for CAVH vehicular control comprise methods for system operational control. In some embodiments, the methods for system operational control comprise communicating between one or more of an OBU, RSU, TCU, and/or TCC; optimizing a network; and/or responding to a security and/or emergency event.

In some embodiments, the system comprises a Prediction/Analysis as a Service sub-system. In some embodiments, the Prediction/Analysis as a Service sub-system comprises cloud-computing methods for CAVH system prediction and/or analysis. In some embodiments, the cloud-computing methods for CAVH system prediction and/or analysis comprise methods for vehicle activity prediction and/or analysis. In some embodiments, the cloud-computing methods for CAVH system prediction and/or analysis comprise methods for vehicle activity prediction/analysis. In some embodiments, the methods for vehicle activity prediction and/or analysis comprise analyzing CAVH mechanical status, predicting system failure, and/or predicting optimal speed. In some embodiments, the cloud-computing methods for CAVH system prediction and/or analysis comprise methods for corridor activity prediction/analysis. In some embodiments, the methods for corridor activity prediction and/or analysis comprise predicting road traffic, detecting aggressive vehicles, and/or predicting an emergency. In some embodiments, the cloud-computing methods for CAVH system prediction and/or analysis comprise methods for global CAVH system activity prediction and/or analysis. In some embodiments, the methods for global CAVH system activity prediction and/or analysis comprise predicting busy areas and/or busy times, suggesting things to do to a user, determining an optimal travel route, and/or determining an optimal parking lot.

In some embodiments, the system comprises a Security as a Service sub-system. In some embodiments, the Security as a Service sub-system comprises cloud-computing based methods for CAVH system security and protection. In some embodiments, the cloud-computing based methods for CAVH system security and protection comprise multi-layered and/or function-triggered access control methods for CAVH users, operators, managers, and/or developers. In some embodiments, the cloud-computing based methods for CAVH system security and protection comprise managing active cyber security protocols against physical attack. In some embodiments, the cloud-computing based methods for CAVH system security and protection comprise managing active cyber security protocols against attack on a vehicle and/or infrastructure. In some embodiments, the cloud-computing based methods for CAVH system security and protection comprise managing active cyber security protocols against network attack. In some embodiments, the cloud-computing based methods for CAVH system security and protection comprise providing redundancy designs and validating data using sensor-based crowd-validation. In some embodiments, the cloud-computing based methods for CAVH system security and protection comprise interfacing cloud-based security with a second service, e.g., CAVH planning, CAVH control, and/or data storage.

In some embodiments, the system comprises a Privacy as a Service sub-system. In some embodiments, the Privacy as a Service sub-system comprises cloud-computing methods for protecting CAVH system privacy. In some embodiments, protecting CAVH system privacy comprises protecting user information. In some embodiments, user information comprises one or more of a user profile, user preferences, and/or trade record. In some embodiments, protecting CAVH system privacy comprises protecting user and vehicle activity information. In some embodiments, user and vehicle activity information comprises travel trajectory, trip origin, trip destination, and/or trip schedule. In some embodiments, protecting CAVH system privacy comprises protecting local and global operations. In some embodiments, local and global operations comprise data collection, data storage, and/or leveled data access control.

In some embodiments, the system comprises a Storage as a Service sub-system. In some embodiments, the Storage as a Service sub-system comprises cloud-based storage for user, vehicle, and/or infrastructure profile information. In some embodiments, the Storage as a Service sub-system is configured to provide real-time data storage and retrieval. In some embodiments, the data storage is in-memory or on-site edge storage. In some embodiments, the Storage as a Service sub-system is configured to store and/or retrieve real-time sensing data, real-time control data, and/or real-time communication data. In some embodiments, the Storage as a Service sub-system is configured to provide short-term cloud-based data storage and retrieval. In some embodiments, the Storage as a Service sub-system is configured to store and manage event data, e.g., event data comprising one or more of a traffic crash, network congestion pattern, weather event, and/or road construction. In some embodiments, the short-term cloud-based data storage and retrieval stores and manages data from the past 1 to 7 days (e.g., 0.5, 1, 1.5, 2, 2.5, 3, 3.5, 4, 4.5, 5, 5.5, 6, 6.5, or 7 days). In some embodiments, the Storage as a Service sub-system is configured to provide long-term data storage and retrieval. In some embodiments, the long-term data storage comprises use of a magnetic tape-based, magnetic disc-based, and/or flash memory-based medium. In some embodiments, the long-term data comprises one or more of historical recurrent CAVH congestion/control patterns, non-recurrent CAVH congestion/control patterns, user profiles, CAVH vehicle status, OBU status, and/or RSU status.

In some embodiments, the system comprises a Connectivity as a Service sub-system. In some embodiments, the Connectivity as a Service sub-system comprises cloud computing-based communication and network services. In some embodiments, the communication and network services are configured to connect one or more of a CAVH user, CAVH vehicle, CAVH infrastructure, CAVH system, non-CAVH user, non-CAVH vehicle, non-CAVH infrastructure, and/or non-CAVH system.

In some embodiments, the Connectivity as a Service sub-system comprises a User-to-System component connecting CAVH users and CAVH cloud. In some embodiments, the User-to-System component connects CAVH users and CAVH cloud on demand. In some embodiments, the User-to-System component connects CAVH users and CAVH cloud using wireless communication. In some embodiments, the User-to-System component connects CAVH users and CAVH cloud using a cellular network. In some embodiments, the User-to-System component connects CAVH users and CAVH cloud using a 4G-LTE or 5G network. In some embodiments, the User-to-System component connects CAVH users and CAVH cloud using communication that provides robust communication over a poor quality network. In some embodiments, the User-to-System component connects CAVH users and CAVH cloud using communication that is not limited by latency, packet-loss rate, system delay, and/or bandwidth. In some embodiments, the User-to-System component is configured to send data of user-end methods to CAVH cloud for calculation, analyzing, distribution and storage. In some embodiments, the User-to-System component is configured to send data aggregated from other CAVH components to users as system feedback.

In some embodiments, the Connectivity as a Service sub-system comprises a Vehicle-to-System component connecting CAVH vehicles and CAVH cloud system. In some embodiments, the Vehicle-to-System component connects CAVH vehicles and CAVH cloud system in real-time. In some embodiments, the Vehicle-to-System component connects CAVH vehicles and CAVH cloud system using a high-class wireless communication. In some embodiments, the Vehicle-to-System component is configured to collect vehicle-end data. In some embodiments, the Vehicle-to-System component is configured to implement vehicle-end functions. In some embodiments, the Vehicle-to-System component is configured to send data to a vehicle-end subsystem to support CAVH driving.

In some embodiments, the Connectivity as a Service sub-system comprises a RSU-to-System component connecting a CAVH RSU and CAVH cloud system. In some embodiments, the RSU-to-System component connects a CAVH RSU and CAVH cloud system in real-time. In some embodiments, the RSU-to-System component connects a CAVH RSU and CAVH cloud system through a high-speed wired internet, high-speed wireless internet, and/or high-speed ethernet connection. In some embodiments, the RSU-to-System component is configured to collect RSU-end data. In some embodiments, the RSU-to-System component is configured to provide RSU-end data to a cloud server. In some embodiments, the RSU-to-System component is configured to send data to a RSU-end subsystem. In some embodiments, the data sent to a RSU-end subsystem are input to methods implementing RSU functions. In some embodiments, the RSU-to-System component is configured to perform as a communication bridge to extend and/or enhance the communication between cloud server and users/vehicles that have a connection with an RSU.

In some embodiments, the Connectivity as a Service sub-system comprises a Vehicle-to-Vehicle communication component connecting CAVH vehicles. In some embodiments, the Vehicle-to-Vehicle communication component connects CAVH vehicles in real-time. In some embodiments, the Vehicle-to-Vehicle communication component connects CAVH vehicles using local dedicated communication. In some embodiments, the Vehicle-to-Vehicle communication component connects CAVH vehicles using Dedicated Short Range Communications (DSRC). In some embodiments, the Vehicle-to-Vehicle communication component is configured to extend and/or enhance connection between cloud and user and/or vehicle. In some embodiments, the Vehicle-to-Vehicle communication component is configured to share on-board sensor data to enhance implementation of vehicle-end methods. In some embodiments, the Vehicle-to-Vehicle communication component is configured to share mission critical data to enhance implementation of vehicle-end methods.

In some embodiments, the Connectivity as a Service sub-system comprises a Vehicle/User-to-Infrastructure component connecting vehicles and RSU. In some embodiments, the Vehicle/User-to-Infrastructure component connects vehicles and RSU in real-time. In some embodiments, the Vehicle/User-to-Infrastructure component connects vehicles and RSU using local dedicated communication. In some embodiments, the Vehicle/User-to-Infrastructure component connects vehicles and RSU using DSRC. In some embodiments, the Vehicle/User-to-Infrastructure component is configured to extend and/or enhance a user and/or vehicle connection with cloud server. In some embodiments, the Vehicle/User-to-Infrastructure component is configured to extend and/or enhance a connection using an RSU as a bridge joint.

In some embodiments, the Connectivity as a Service sub-system comprises an Infrastructure-to-Infrastructure component connecting infrastructures. In some embodiments, the Infrastructure-to-Infrastructure component connects infrastructures using wired internet and/or ethernet. In some embodiments, the Infrastructure-to-Infrastructure component is configured to function as an infrastructure-end system. In some embodiments, the Infrastructure-to-Infrastructure component is configured to extend and/or enhance connection between cloud and infrastructure. In some embodiments, the Infrastructure-to-Infrastructure component is configured to extend and/or enhance connection between cloud and infrastructure, wherein said cloud and infrastructure do not have a direct connection.

In some embodiments, the Connectivity as a Service sub-system comprises a User-to-Vehicle component connecting a user and a vehicle. In some embodiments, the User-to-Vehicle component connects a user and a vehicle, wherein said vehicle is registered by said user. In some embodiments, the User-to-Vehicle component connects a user and a vehicle, wherein said vehicle is driven by said user. In some embodiments, the User-to-Vehicle component is configured to update an active trip demand change of said user. In some embodiments, the User-to-Vehicle component is configured to receive system feedback. In some embodiments, the system feedback comprises system status. In some embodiments, the system feedback comprises trip status. In some embodiments, the User-to-Vehicle component is configured to enhance user connectivity to said system through vehicle-to-system communication.

In some embodiments, the cloud-based CAVH service system comprises User End Methods and Systems configured to provide a method for user behavioral profiling. In some embodiments, the cloud-based CAVH service system comprises User-End Methods and Systems configured to provide pre-trip user activity planning, within-trip user activity planning, and post-trip methods. In some embodiments, the user behavioral profiling method comprises one or more of: aggregating anonymous user data to establish user behavioral groups; matching a user to a user profile type; creating customized CAVH services for a user; and/or identifying and adapting to changes in user behavior and preferences. In some embodiments, the anonymous user data comprises one or more of social-demographic data, CAVH vehicle ownership data, CAVH trip data, CAVH service preference data, and/or CAVH trip characteristic data. In some embodiments, the CAVH services comprise one or more of a preference for road type or driving mode. In some embodiments, the road type is a highway, arterial road, tollway, and/or non-tollway. In some embodiments, the driving mode minimizes travel time, maximizes comfort, or minimizes carbon footprint. In some embodiments, identifying and adapting to changes in user behavior and preferences comprises use of user-system interactions. In some embodiments, identifying and adapting to changes in user behavior and preferences comprises use of real-time vehicle and user behavioral data analysis. In some embodiments, real-time vehicle and user behavioral data analysis is authorized by a user. In some embodiments, real-time vehicle and user behavioral data analysis comprises analyzing data characterizing passenger activity.

In some embodiments, pre-trip activity planning customizes a CAVH trip for each user. In some embodiments, pre-trip activity planning comprises recommending a CAVH trip plan based on the matched user profile groups and/or the states of CAVH facilities. In some embodiments, pre-trip activity planning further comprises confirming the CAVH trip plan. In some embodiments, a user confirms said trip plan. In some embodiments, confirming the CAVH trip plan is based on the matched user profile groups and the states of CAVH facilities. In some embodiments, the cloud-based CAVH service system further comprises initializing a CAVH trip based on a confirmed trip plan. In some embodiments, initializing a CAVH trip comprises providing notification to a user of said trip. In some embodiments, initializing a CAVH trip comprises managing communication between OBU and RSU components. In some embodiments, pre-trip activity planning comprises establishing communication with a second CAVH service subsystem, e.g., a transaction subsystem, a payment subsystem, a ridesharing subsystem, and/or a car-pooling subsystem. In some embodiments, the CAVH trip plan comprises one or more of origin, destination, departure time, and routing plan.

In some embodiments, the within-trip activity planning provides support to users during a CAVH trip. In some embodiments, the within-trip activity planning is configured to adapt to user-requested trip plan changes. In some embodiments, the user-requested trip plan changes comprise one or more of switching between driving modes, switching between ride sharing modes, and/or switching between platooning modes. In some embodiments, driving modes comprise one or more of eco-driving, performance driving, and/or mobility-first driving. In some embodiments, the within-trip activity planning comprises recommending a service or trip plan change in response to one or more of a transportation network condition; traffic event and/or traffic control; or multi-modal transportation information. In some embodiments, traffic control comprises lane regulation. In some embodiments, multi-modal transportation information comprises one or more of a transition with public transit schedule, destination activity schedules, and/or dynamic requests from other CAVH users. In some embodiments, dynamic requests comprise one or more of a ride-sharing request and/or information sharing. In some embodiments, within-trip activity planning comprises providing within-trip information to other system components or external services for trip plan execution, payment and transactions, social network, and/or emergency management. In some embodiments, a traffic event is a traffic incident, a work zone, and/or inclement weather.

In some embodiments, post-trip methods comprise one or more of egressing and signing off CAVH systems; finalizing transactions and logs of a completed CAVH trip; data packaging and aggregation for analytics; making destination and activity recommendations; switching driving modes; and/or providing and/or receiving parking information.

In some embodiments, the cloud-based CAVH service system comprises Vehicle End Systems and Methods configured to control CAVH vehicles. In some embodiments, the Vehicle End Systems and Methods comprise a Vehicle profile subsystem configured to manage the profiles of CAVH vehicles. In some embodiments, the Vehicle profile subsystem is configured to establish vehicle profile groups in the cloud based on anonymous vehicle data. In some embodiments, the anonymous vehicle data comprises one or more of vehicle mechanical feature, historical and statistic driving records, lane accessibility, CAVH automation level, and/or available CAVH devices and dynamic information. In some embodiments, the dynamic information comprises one or more of vehicle dynamic status and/or on-board sensor data. In some embodiments, the vehicle dynamic status comprises one or more of velocity, speed, acceleration, and/or map location. In some embodiments, the Vehicle profile subsystem is configured to match CAVH vehicles with established vehicle profile groups in the cloud. In some embodiments, the Vehicle profile subsystem is configured to provide customized vehicle guidance and control schemes designed for different types of CAVH vehicles. In some embodiments, the customized vehicle guidance and control schemes comprise one or more of a level of automation, a level of connectivity, and/or an interaction with infrastructure or other vehicles. In some embodiments, the Vehicle profile subsystem is configured to provide real-time detection of vehicle characteristic changes. In some embodiments, the vehicle characteristic changes comprise one or more of the addition or reduction of vehicle functionalities, vehicle mechanical and control system conditions, and/or vehicle system upgrading and maintenance status.

In some embodiments, the Vehicle End Systems and Methods comprise a Guidance subsystem configured to generate a CAVH guidance plan. In some embodiments, the Guidance subsystem provides CAVH map management methods. In some embodiments, the map management methods comprise generating and/or updating a CAVH facility map and/or a local CAVH map. In some embodiments, the CAVH facility map and/or local CAVH map is a high-resolution map. In some embodiments, the Guidance subsystem provides trip guidance management methods. In some embodiments, the trip guidance management methods comprise generating and/or updating a CAVH trip guidance plan. In some embodiments, the trip guidance plan comprises data comprising one or more of routes, path choices, CAVH access and/or exit point, multi-modal connection, CAVH platoon, and/or car-pooling. In some embodiments, the trip guidance management methods comprise generating and/or updating a CAVH trip guidance plan using data comprising one or more of user-end method data, vehicle profile, trip origin, and/or trip estimation.

In some embodiments, the user-end method data comprises one or more of user profile, user-end method pre-trip data, and/or user-end method within-trip data.

In some embodiments, the Vehicle End Systems and Methods comprise a localization-enhancement subsystem. In some embodiments, the localization-enhancement subsystem is configured to manage crowd-sourced sensor data. In some embodiments, the localization-enhancement subsystem is configured to implement a method comprising managing data from onboard sensors of a vehicle, data from surrounding vehicles, data from road-side sensors, and sensor data shared from other nearby CAVH vehicles. In some embodiments, the managing comprises organizing data from onboard sensors of a vehicle, data from surrounding vehicles, data from road-side sensors, and sensor data shared from other nearby CAVH vehicles. In some embodiments, the managing comprises sharing data from onboard sensors of a vehicle, data from surrounding vehicles, data from road-side sensors, and sensor data shared from other nearby CAVH vehicles. In some embodiments, the localization-enhancement subsystem is configured to fuse data in the cloud to improve the accuracy of self-positioning, wherein said data comprises one or more of crowd-sourced sensor data, self-positioning data, and/or map data.

In some embodiments, the Vehicle End Systems and Methods comprise a Navigation subsystem configured to support the navigation of CAVH vehicles. In some embodiments, the Navigation subsystem is configured to navigate CAVH vehicles. In some embodiments, the Navigation subsystem is configured to navigate CAVH vehicles using crowd-sourced or shared data, user-end within-trip method data, or data provided by other CAVH users. In some embodiments, the Navigation subsystem is configured to navigate CAVH vehicles using instructions to join a platoon, instructions to leave a platoon, in-platoon navigation directions, ride sharing pick-up instructions, and/or ride sharing drop-off instructions.

In some embodiments, the Vehicle End Systems and Methods comprise a Control subsystem configured to support a CAVH vehicle control component. In some embodiments, the Control subsystem provides control instructions using a roadside component. In some embodiments, the instructions comprise adjusting the CAVH control signal based on an external or an internal signal. In some embodiments, the external signal is one or more of an event, incident, and/or malicious and/or aggressive vehicle. In some embodiments, the internal signal comprises a cloud-based statistical analysis of mechanical features. In some embodiments, the Control subsystem provides control instructions using a remote component. In some embodiments, the remote component controls the CAVH in response to emergency, theft, physical attack, and/or cyber-attack.

In some embodiments, the cloud-based CAVH service system comprises an Infrastructure-End System configured to support control of transportation infrastructure, RSU, TCU, and TCC. In some embodiments, the infrastructure-end system comprises a subsystem for interacting with transportation infrastructure, said subsystem configured to interact with transportation infrastructure units or systems. In some embodiments, the subsystem for interacting with transportation infrastructure comprises: a cloud-infrastructure data collection component configured to pull data or feedback from infrastructure units for further analysis and backup; a coordinated control component configured to send feedback to infrastructure unit to enhance the function of the unit; a cloud-based component configured to integrate sensing data from infrastructure-based and probe-based sensors; and/or an infrastructure maintenance component configured to provide information and solution for transportation infrastructure hardware and software through periodic automated detection. In some embodiments, sensing data is received from an agency and/or a CAVH user vehicle. In some embodiments, the infrastructure-end system comprises a roadside unit subsystem for interacting with a roadside unit system. In some embodiments, the roadside unit subsystem comprises: a cloud-RSU data management component configured to pull data from RSUs for sharing and fusing; and configured to push external or processed data to RSUs for further vehicle and infrastructure control computing; a crowd-sensing component configured to fuse vehicle and infrastructure sensor data; a coordinated control component configured to coordinate control of cloud and RSUs by applying control signals through RSUs for vehicles, platoons, links, nodes, corridors, and network; and/or an infrastructure maintenance component configured to provide information and solutions for RSU hardware and software through periodic automated detection; and by alerting CAVH vehicles, CAVH infrastructure, and transportation infrastructure regarding maintenance.

In some embodiments, the coordinated control component is configured to implement redundancy and load balancing for safety and reliability. In some embodiments, the RSU data comprises video data and/or point cloud data. In some embodiments, the fused data provides a multi-perspective sensing of vehicle and infrastructure dynamics. In some embodiments, the fused data is analyzed to provide: sensing of individual vehicle and vehicle platoons at a microscopic level, sensing of roadway links and nodes at mesoscopic level, and/or sensing of corridor and networks at the macroscopic level.

In some embodiments, the infrastructure-end system comprises a TCC/TCU control subsystem for interacting with a TCC/TCU system. In some embodiments, the TCC/TCU control subsystem comprises: a CAVH operational optimization component configured to optimize system level tasks; a multi-layer controlling and coordinating component configured to compute and distribute control signals; and to aggregate sensing and control feedback; a CAVH tasks delegation component configured to delegate tasks to TCU/TCCs; an external connectivity component configured to connect with external agencies and organizations to analyze TCC/TCU/TOC tasks; and a fleet/vehicle management component configured to manage the status, positioning, and dispatching of CAVH vehicles. In some embodiments, tasks delegated to TCU/TCCs comprise platoon control and/or route guidance. In some embodiments, the operational optimization component analyzes vehicle traces using deep learning. In some embodiments, the system level tasks comprise CAVH origin and destination (OD) demand estimation, route planning and guidance, and network demand management. In some embodiments, the external agencies comprise a transit agency or a tollway agency.

In some embodiments, the cloud-based CAVH service system comprises a System Analytics/Optimization component configured to perform System Analytics/Optimization Methods. In some embodiments, the System Analytics/Optimization component is configured to perform: a Heterogeneous Sensing Data Integration method comprising collecting and fusing different sensing data from OBU, RSU, and transportation infrastructures; a Dynamic object mapping method comprising reporting and positioning a CAVH vehicle, surrounding CAVH vehicles, and/or surrounding non-CAVH vehicles; an infrastructure data provision and updating method comprising providing road, transportation, and CAVH infrastructure data in real-time to one or more edge nodes; an event data collection and dissemination method comprising collecting and broadcasting event data; a Control Signal/Logic Optimization method comprising providing control signals and/or a logic optimization algorithm; a system supply-demand estimation and management method comprising inferring travel demand; inferring traffic patterns; inferring the CAVH origin-destination and routing demand; and making recommendations on congestion mitigation and service improvement; a vehicle dispatching and routing management optimization method comprising one or more of minimizing total travel time, minimizing waiting time and deadheading time, and/or increasing system reliability and safety; and/or a system maintenance method comprising one or more of periodically monitoring and assessing CAVH system health and load, detecting system failures and issues, and making maintenance recommendations.

In some embodiments, the vehicle dispatching and routing management optimization method comprises determining vehicle assignment, vehicle dispatching, vehicle activation, vehicle deactivation, vehicle routing, and vehicle modes. In some embodiments, the vehicle mode is eco-driving, aggressive, or conservative. In some embodiments, the edge node is a RSU or TCU. In some embodiments, the Control Signal/Logic Optimization method analyzes one or more of real-time feasibility, computational speed, comfort, safety, fuel consumption, vehicle position, and/or vehicle velocity. In some embodiments, the CAVH infrastructure data comprises one or more of road geometry, lane channelizing, intersection design, and/or on and off ramp locations. In some embodiments, the infrastructure data provision and updating method comprises dynamic indexing, segmenting, and managing real-time feedback and comparison for updating infrastructure changes. In some embodiments, event data comprises one or more of traffic incidents, lane-blocking, work zones, and/or special events. In some embodiments, the event data is analyzed to optimize traffic flow. In some embodiments, control signals and/or logic optimization algorithm use data comprising one or more of real-time feasibility, computational speed, comfort, safety, fuel consumption, and/or vehicle position and velocity.

In some embodiments, the cloud-based CAVH service system comprises a Cloud Data Computing/Integration/Management component configured to process, integrate, and manage CAVH data in the cloud. In some embodiments, the Cloud Data Computing/Integration/Management component processes, integrates, and manages CAVH data in the cloud at the network, corridor, link, node, and vehicle levels. In some embodiments, the Cloud Data Computing/Integration/Management component is configured to perform: Network level data aggregation and integration to create performance metrics of network-wide CAVH system service status, CAVH infrastructure conditions, and transportation network and infrastructure conditions; to identify problematic subnetwork, corridors, links, and/or nodes, and to provide said performance metrics to system optimization services and models; Corridor level data aggregation and integration to derive performance metrics and to exchange data externally with traffic management centers; Link-level data aggregation and integration to develop traffic status measurements of link distance between different nodes, number of links, routing strategy, congestion on links, and/or signal operation performance; and to exchange said traffic status measurements with an RSU and/or TCC/TCU; Node-level data aggregation and integration to develop traffic information at network nodes using on-site sensor data; and to exchange said traffic information with one or more of an RSU, TCC/TCU, intersection, and/or ramp; and Vehicle-level data aggregation and integration to analyze and estimate vehicle state; to assist a control processor to execute commands, reduce errors, and disturbances; to exchange vehicle state data with CAVH vehicles; and to communicate with non-CAVH vehicles. In some embodiments, the performance metrics comprise one or more of travel time index, travel time reliability, LOS (level of service), and/or real-time infrastructure conditions. In some embodiments, analyzing and estimating vehicle state comprises analysis of steering, thrust, and brake data.

In some embodiments, the cloud-based CAVH service system comprises a CAVH Security component configured to protect CAVH cloud from cyber-attacks. In some embodiments, the CAVH Security component comprises: Cyber-attack detection method comprising detecting malicious cyber activities and/or abnormal physical phenomenon; Cyber-attack profiling/identifying method comprising identifying a cyber-attack type, analyzing features of a cyber-attack, assessing effects of a cyber-attack on CAVH system, and managing a cyber-attack feature database to identify a cyber-attack matching; Network-based attack countermeasure method comprising providing and managing a layer of communication protection, cyber security software, and firewall hardware/devices; and CAVH-System-based attack countermeasures. In some embodiments, the CAVH-System-based attack countermeasures comprise Crossvalidation, Communication redundancy, and/or Active Defense. In some embodiments, the Crossvalidation comprises a fake information cyber-attack countermeasure configured to coordinate CAVH system components to protect the CAVH. In some embodiments, the Communication redundancy comprises a cyber-attack countermeasure configured to provide redundant communication units at the edge of said CAVH cloud system to increase communication reliability. In some embodiments, the Active Defense comprises a cyber-attack countermeasure configured to detect suspicious activities in CAVH system. In some embodiments, the suspicious activities in CAVH system are undefined by the cyber-attack profiling/identification system. In some embodiments, the Active Defense comprises a cyber-attack countermeasure configured to analyze features of a cyber-attack, assess the impact and risk of a cyber-attack, to reject a service request of a cyber-attack, and to report said cyber-attack to public security. In some embodiments, the abnormal physical phenomenon affects vehicle dynamics and/or infrastructure states. In some embodiments, a cyber-attack is a DDOS, sibyl attack, and/or malicious information attack. In some embodiments, Crossvalidation coordinates data received from a roadside CAVH system component, a vehicle CAVH system component, a user profile, and/or crowd-sourced sensor data to implement a cross-validation mechanism.

In some embodiments, the cloud-based CAVH service system comprises a CAVH Privacy Protection component configured to protect and anonymize user information. In some embodiments, the CAVH Privacy Protection component is configured to provide user consent methods and to protect user profile and travel choice data. In some embodiments, the CAVH Privacy Protection component is configured to provide CAVH Privacy Protection to one or more types of private information. In some embodiments, types of private information comprise one or more of: Confidential information comprising one or more of system data, network data, interface data, CAVH operation data, and user sensitive data; User-Consented Shared with CAVH System information comprising one or more of user account, travel plan, travel preference, incident-triggered data, general user data, or vehicle behavioral data; User-consented shared with friends information comprising one or more of location, trajectory, or personal messages; User-Consented Shared with Public information comprising one or more of user photo, user phone number, ridesharing-based travel origin and destination (OD), and travel trajectory; and Public Information comprising one or more of statistical data, aggregate data, and encrypted data. In some embodiments, Confidential information is severely privacy protected; and/ or said User-Consented Shared with CAVH System information is shared with CAVH system under user permission; and/or said User-consented shared with friends information is shared with user friends under user permission. In some embodiments, the CAVH Privacy Protection component is configured to provide CAVH user and vehicle anonymous profiling comprising one or more of aggregated user and vehicle types for pre-configuring service and operational types, schemes, and strategies. In some embodiments, the CAVH Privacy Protection component is configured to provide CAVH Trip Information Privacy Protection comprising one-way encryption, bidirectional encryption, and CAVH trip information privacy protection to protect one or more of travel trajectory, trip origin and destination (OD), CAVH entry, and/or CAVH existing location. In some embodiments, the CAVH Privacy Protection component is configured to provide CAVH Sensing Data Privacy Protection methods for obfuscating and anonymizing CAVH sensing data comprising one or more of fragmenting user trajectory, blurring a human face, and/or encrypting a user cellphone number. In some embodiments, the CAVH Privacy Protection component is configured to provide CAVH Access Control and/or Data element availability methods comprising managing CAVH local and global data availability and controlling access to user data, vehicle activity data, and system control data.

In some embodiments, the technology provides a cloud-based CAVH service system as described herein and a vehicle operations and control system comprising one or more of a roadside unit (RSU) network; a Traffic Control Unit (TCU) and Traffic Control Center (TCC) network (e.g., TCU/TCC network); a vehicle comprising an onboard unit (OBU); and/or a Traffic Operations Center (TOC).

In some embodiments, the technology provides a system (e.g., a vehicle operations and control system comprising a RSU network; a TCU/TCC network; a vehicle comprising an onboard unit OBU; a TOC; and a cloud-based platform configured to provide information and computing services) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RSU network of embodiments of the systems provided herein comprises an RSU subsystem. In some embodiments, the RSU subsystem comprises: a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, communication module communicates using wired or wireless media.

In some embodiments, sensing module comprises a radar based sensor. In some embodiments, sensing module comprises a vision based sensor. In some embodiments, sensing module comprises a radar based sensor and a vision based sensor and wherein said vision based sensor and said radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera.

In some embodiments, the sensing module comprises a satellite based navigation system. In some embodiments, the sensing module comprises an inertial navigation system. In some embodiments, the sensing module comprises a satellite based navigation system and an inertial navigation system and wherein said sensing module comprises a satellite based navigation system and said inertial navigation system are configured to provide vehicle location data. In some embodiments, the satellite based navigation system is a Differential Global Positioning Systems (DGPS) or a Bei-Dou Navigation Satellite System (BDS) System or a GLO-NASS Global Navigation Satellite System. In some embodiments, the inertial navigation system comprises an inertial reference unit.

In some embodiments, the sensing module of embodiments of the systems described herein comprises a vehicle identification device. In some embodiments, the vehicle identification device comprises RFID, Bluetooth, Wi-fi (IEEE 802.11), or a cellular network radio, e.g., a 4G or 5G cellular network radio.

In some embodiments, the RSU sub-system is deployed at a fixed location near road infrastructure. In some embodiments, the RSU sub-system is deployed near a highway roadside, a highway on ramp, a highway off ramp, an interchange, a bridge, a tunnel, a toll station, or on a drone over a critical location. In some embodiments, the RSU sub-system is deployed on a mobile component. In some embodiments, the RSU sub-system is deployed on a vehicle drone over a critical location, on an unmanned aerial vehicle (UAV), at a site of traffic congestion, at a site of a traffic accident, at a site of highway construction, at a site of extreme weather. In some embodiments, a RSU sub-system is positioned according to road geometry, heavy vehicle size, heavy vehicle dynamics, heavy vehicle density, and/or heavy vehicle blind zones. In some embodiments, the RSU sub-system is installed on a gantry (e.g., an overhead assembly, e.g., on which highway signs or signals are mounted). In some embodiments, the RSU sub-system is installed using a single cantilever or dual cantilever support.

In some embodiments, the TCC network of embodiments of the systems described herein is configured to provide traffic operation optimization, data processing and archiving. In some embodiments, the TCC network comprises a human operations interface. In some embodiments, the TCC network is a macroscopic TCC, a regional TCC, or a corridor TCC based on the geographical area covered by the TCC network. See, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the TCU network is configured to provide real-time vehicle control and data processing. In some embodiments, the real-time vehicle control and data processing are automated based on preinstalled algorithms.

In some embodiments, the TCU network is a segment TCU or a point TCUs based on based on the geographical area covered by the TCU network. Sec, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes. In some embodiments, the system comprises a point TCU physically combined or integrated with an RSU. In some embodiments, the system comprises a segment TCU physically combined or integrated with a RSU.

In some embodiments, the TCC network of embodiments of the systems described herein comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. Sec, e.g., U.S. patent application Ser. No. 15/628, 331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the TCU network comprises: segment TCUs configured to process information from corridor and/or point TOCs and provide control targets to point TCUs; and point TCUs configured to process information from the segment TCU and RSUs and provide vehicle-based control instructions to an RSU. See, e.g., U.S. patent application Ser. No. 15/628,331, filed Jun. 20, 2017 and United States Provisional Patent Application Ser. Nos. 62/626,862, filed Feb. 6, 2018, 62/627,005, filed Feb. 6, 2018, 62/655, 651, filed Apr. 10, 2018, and 62/669,215, filed May 9, 2018, each of which is incorporated herein in its entirety for all purposes.

In some embodiments, the RSU network of embodiments of the systems provided herein provides vehicles with customized traffic information and control instructions and receives information provided by vehicles.

In some embodiments, the TCC network of embodiments of the systems provided herein comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, TCU network of embodiments of the systems described herein comprises one or more TCUs comprising a sensor and control module configured to provide the sensing and control functions of an RSU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 4G, 5G, and/or wifi radio. In some embodiments, the TCU network comprises one or more TCUs comprising a transmission and network module configured to provide communication network function for data exchange between an automated heavy vehicles and a RSU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RSU. In some embodiments, the management and control methods of an RSU comprise local cooperative control of vehicles and roads, system monitoring, and emergency service. In some embodiments, the TCC network comprises one or more TCCs further comprising an application module and said service management module provides data analysis for the application module. In some embodiments, the TCU network comprises one or more TCUs further comprising an application module and said service management module provides data analysis for the application module.

In some embodiments, the TOC of embodiments of the systems described herein comprises interactive interfaces. In some embodiments, the interactive interfaces provide control of said TCC network and data exchange. In some embodiments, the interactive interfaces comprise information sharing interfaces and vehicle control interfaces. In some embodiments, the information sharing interfaces comprise: an interface that shares and obtains traffic data; an interface that shares and obtains traffic incidents; an interface that shares and obtains passenger demand patterns from shared mobility systems; an interface that dynamically adjusts prices according to instructions given by said vehicle operations and control system; and/or an interface that allows a special agency (e.g., a vehicle administrative office or police) to delete, change, and share information. In some embodiments, the vehicle control interfaces of embodiments of the interactive interfaces comprise: an interface that allows said vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other share mobility systems. In some embodiments, traffic incidents comprise extreme conditions, major accident, and/or a natural disaster. In some embodiments, an interface allows the vehicle operations and control system to assume control of vehicles upon occurrence of a traffic event, extreme weather, or pavement breakdown when alerted by said vehicle operations and control system and/or other share mobility systems. In some embodiments, an interface allows vehicles to form a platoon with other vehicles when they are driving in the same dedicated and/or same non-dedicated lane.

In some embodiments, the OBU of embodiments of systems described herein comprises a communication module configured to communicate with an RSU. In some embodiments, the OBU comprises a communication module configured to communicate with another OBU. In some embodiments, the OBU comprises a data collection module configured to collect data from external vehicle sensors and internal vehicle sensors; and to monitor vehicle status and driver status. In some embodiments, the OBU comprises a vehicle control module configured to execute control instructions for driving tasks. In some embodiments, the driving tasks comprise car following and/or lane changing. In some embodiments, the control instructions are received from an RSU. In some embodiments, the OBU is configured to control a vehicle using data received from an RSU. In some embodiments, the data received from said RSU comprises: vehicle control instructions; travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, OBU is configured to send data to an RSU. In some embodiments, the data sent to said RSU comprises: driver input data; driver condition data; vehicle condition data; and/or goods condition data. In some embodiments, the driver input data comprises origin of the trip, destination of the trip, expected travel time, service requests, and/or level of hazardous material. In some embodiments, the driver condition data comprises driver behaviors, fatigue level, and/or driver distractions. In some embodiments, the vehicle condition data comprises vehicle ID, vehicle type, and/or data collected by a data collection module. In some embodiments, the goods condition data comprises material type, material weight, material height, and/or material size.

In some embodiments, the OBU of embodiments of systems described herein is configured to collecting data comprising: vehicle engine status; vehicle speed; goods status; surrounding objects detected by vehicles; and/or driver conditions. In some embodiments, the OBU is configured to assume control of a vehicle. In some embodiments, the OBU is configured to assume control of a vehicle when the automated driving system fails. In some embodiments, the OBU is configured to assume control of a vehicle when the vehicle condition and/or traffic condition prevents the automated driving system from driving said vehicle. In some embodiments, the vehicle condition and/or traffic condition is adverse weather conditions, a traffic incident, a system failure, and/or a communication failure.

In some embodiments, the cloud platform of embodiments of systems described herein is configured to support automated vehicle application services. In some embodiments, the cloud platform is configured according to cloud platform architecture and data exchange standards. In some embodiments, cloud platform is configured according to a cloud operating system. In some embodiments, the cloud platform is configured to provide data storage and retrieval technology, big data association analysis, deep mining technologies, and data security. In some embodiments, the cloud platform is configured to provide data security systems providing data storage security, transmission security, and/or application security. In some embodiments, the cloud platform is configured to provide the said RSU network, said TCU network, and/or said TCC network with information and computing services comprising: Storage as a service (STaaS) functions to provide expandable storage; Control as a service (CCaaS) functions to provide expandable control capability; Computing as a service (CaaS) functions to provide expandable computing resources; and/or Sensing as a service (SEaaS) functions to provide expandable sensing capability. In some embodiments, the cloud platform is configured to implement a traffic state estimation and prediction algorithm comprising: weighted data fusion to estimate traffic states, wherein data provided by the RSU network, Traffic Control Unit (TCU) and Traffic Control Center (TCC) network, and TOC network are fused according to weights determined by the quality of information provided by the RSU network, Traffic Control Unit (TCU) and Traffic Control Center (TCC) network, and TOC network; and estimated traffic states based on historical and present RSU network, Traffic Control Unit (TCU) and Traffic Control Center (TCC) network, and TOC network data.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Features of embodiments of the technology shown in FIG. 2C include, e.g., 2301: Control as a Service central control system; 2302: Control as a Service CAVH Local Link system; 2303: Control as a Service CAVH Corridor system; 2304: Control as a Service CAVH Global network system; 2305: Control as a Service CAVH Remote Link system; 2306: Control sub-systems for CAVH Local Link; 2307: Control sub-systems for CAVH Corridor; 2308: Control sub-systems for CAVH Global network; 2309: Control sub-systems for CAVH Remote Link; 2310: Central system to CAVH Local Link system communication; 2311: Central system to CAVH Corridor system communication; 2312: Central system to CAVH Global network system communication; and 2213: Central system to CAVH Remote Link system communication.

FIG. 2D is a schematic drawing showing an embodiment of the Prediction/Analytic as a Service CAVH cloud based service. Features of embodiments of the technology shown in FIG. 2D include, e.g., 2401: Prediction/Analytic as a Service central prediction control system; 2402: Prediction/Analytic as a Service CAVH Vehicle system; 2403: Prediction/Analytic as a Service CAVH Corridor system; 2404: Prediction/Analytic as a Service CAVH Global network system; 2405: Prediction/Analytic sub-systems for CAVH Vehicle; 2406: Prediction/Analytic sub-systems for CAVH Corridor; 2407: Prediction/Analytic sub-systems for CAVH Global network; 2408: Central system to CAVH Vehicle system communication; 2409: Central system to CAVH Corridor system communication; and 2410: Central system to CAVH Global network system communication.

FIG. 2E is a schematic drawing showing an embodiment of the Security as a Service CAVH cloud based service. Features of embodiments of the technology shown in FIG. 2E include, e.g., 2501: Security as a Service central security control system; 2502: Security as a Service CAVH User/operator/manager/developer system; 2503: Security as a Service CAVH system components cyber-security system; 2504: Security as a Service CAVH security interfaces with other services system; 2505: Security sub-systems for CAVH User/operator/manager/developer; 2506: Security sub-systems for CAVH system components cyber-security; 2507: Security sub-systems for CAVH security interfaces with other services; 2508: Central system to CAVH User/operator/manager/developer system communication; 2509: Central system to CAVH system components cyber-security system communication; and 2510: Central system to CAVH security interfaces with other services system communication.

Figure 2A:
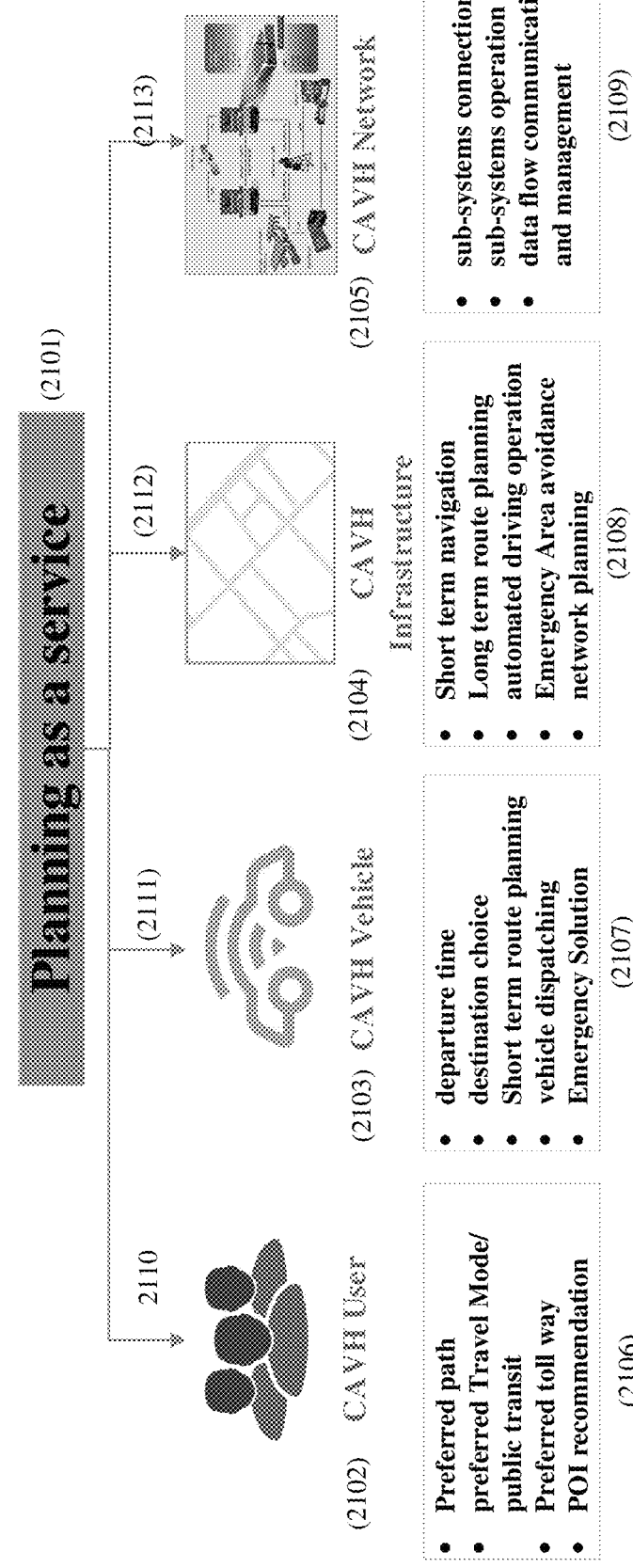
FIG. 2A is a schematic drawing showing an embodiment of the Planning as a Service CAVH cloud based service. Features of embodiments of the technology shown in FIG. 2A include, e.g., 2101: Planning as a Service central control system; 2102: Planning as a Service CAVH user system; 2103: Planning as a Service CAVH vehicle system; 2104: Planning as a Service CAVH infrastructure system; 2105: Planning as a Service CAVH network system; 2106: Planning sub-systems for CAVH user; 2107: Planning sub-systems for CAVH vehicle; 2108: Planning sub-systems for CAVH infrastructure; 2109: Planning sub-systems for CAVH network; 2110: Central system to CAVH user system communication; 2111: Central system to CAVH vehicle system communication; 2112: Central system to CAVH infrastructure system communication; and 2113: Central system to CAVH network communication.
Figure 2F:
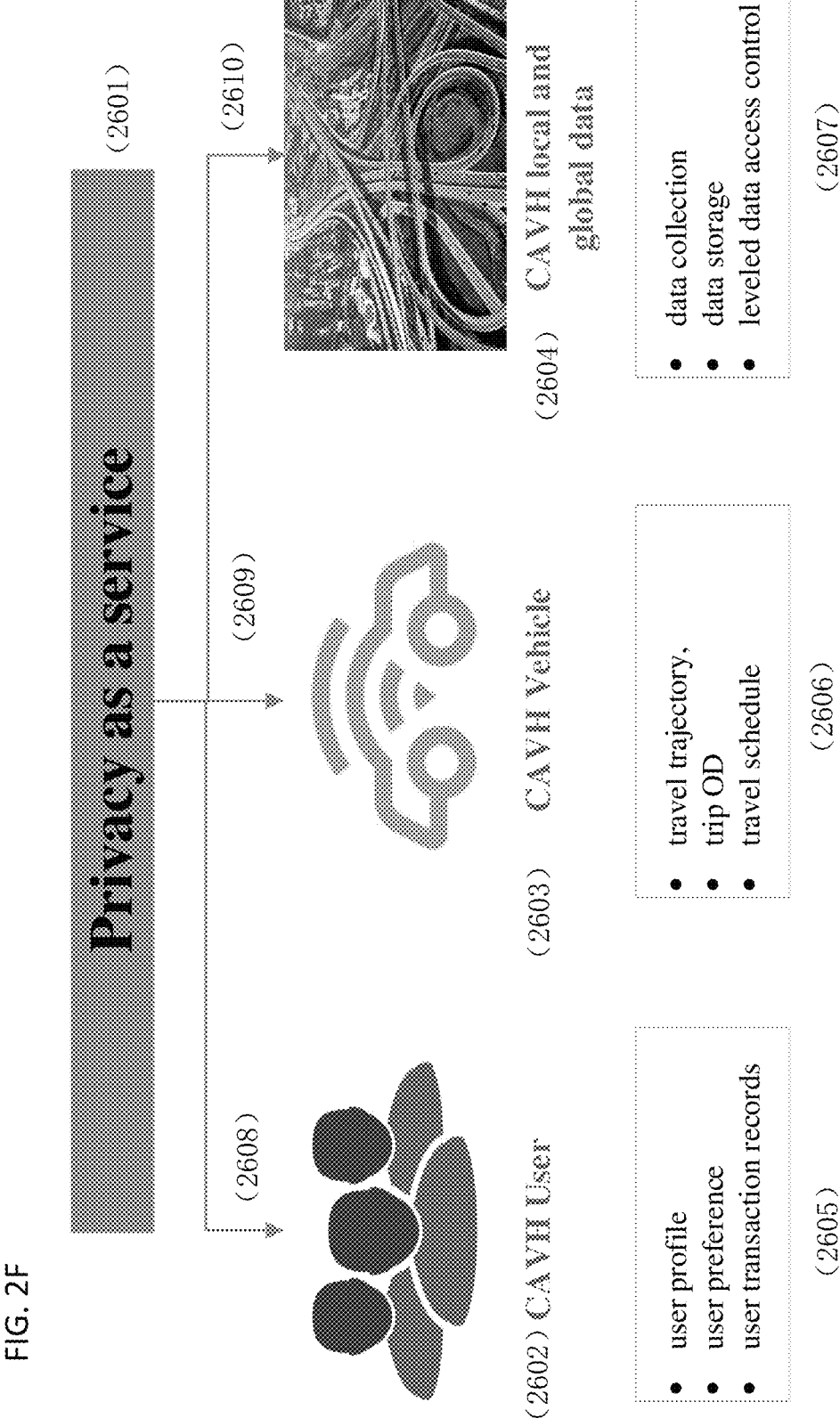
FIG. 2B is a schematic drawing showing an embodiment of the Sensing as a Service CAVH cloud based service. Features of embodiments of the technology shown in FIG. 2B include, e.g., 2201: Sensing as a Service central control system; 2202: Sensing as a Service Heterogenous sensing system; 2203: Sensing as a Service Local and global sensing system; 2204: Sensing as a Service Crowd and multi-perspective sensing system; 2205: Sensing as a Service Network Sensing; 2206: Sensing sub-systems for Heterogenous sensing; 2207: Sensing sub-systems for Local and global sensing; 2208: Sensing sub-systems for Crowd and multi-perspective sensing; 2209: Sensing sub-systems for Network Sensing; 2210: Central system to Heterogeneous sensing system communication; 2211: Central system to Local and global sensing system communication; 2212: Central system to Crowd and multi-perspective sensing system communication; and 2213: Central system to Network Sensing communication.
FIG. 2C is a schematic drawing showing an embodiment of the Control as a Service CAVH cloud based service.

FIG. 2F is a schematic drawing showing an embodiment of the Privacy as a Service CAVH cloud based service. Features of embodiments of the technology shown in FIG. 2F include, e.g., 2601: Privacy as a Service central privacy control system; 2602: Privacy as a Service CAVH user system; 2603: Privacy as a Service CAVH vehicle system; 2604: Privacy as a Service CAVH local and global data system; 2605: Privacy sub-systems for CAVH user; 2606: Privacy sub-systems for CAVH vehicle; 2607: Privacy sub-systems for CAVH local and global data; 2608: Central system to CAVH user system communication; 2609: Central system to CAVH vehicle system communication; and 2610: Central system to CAVH local and global data system communication.

Figure 2G:
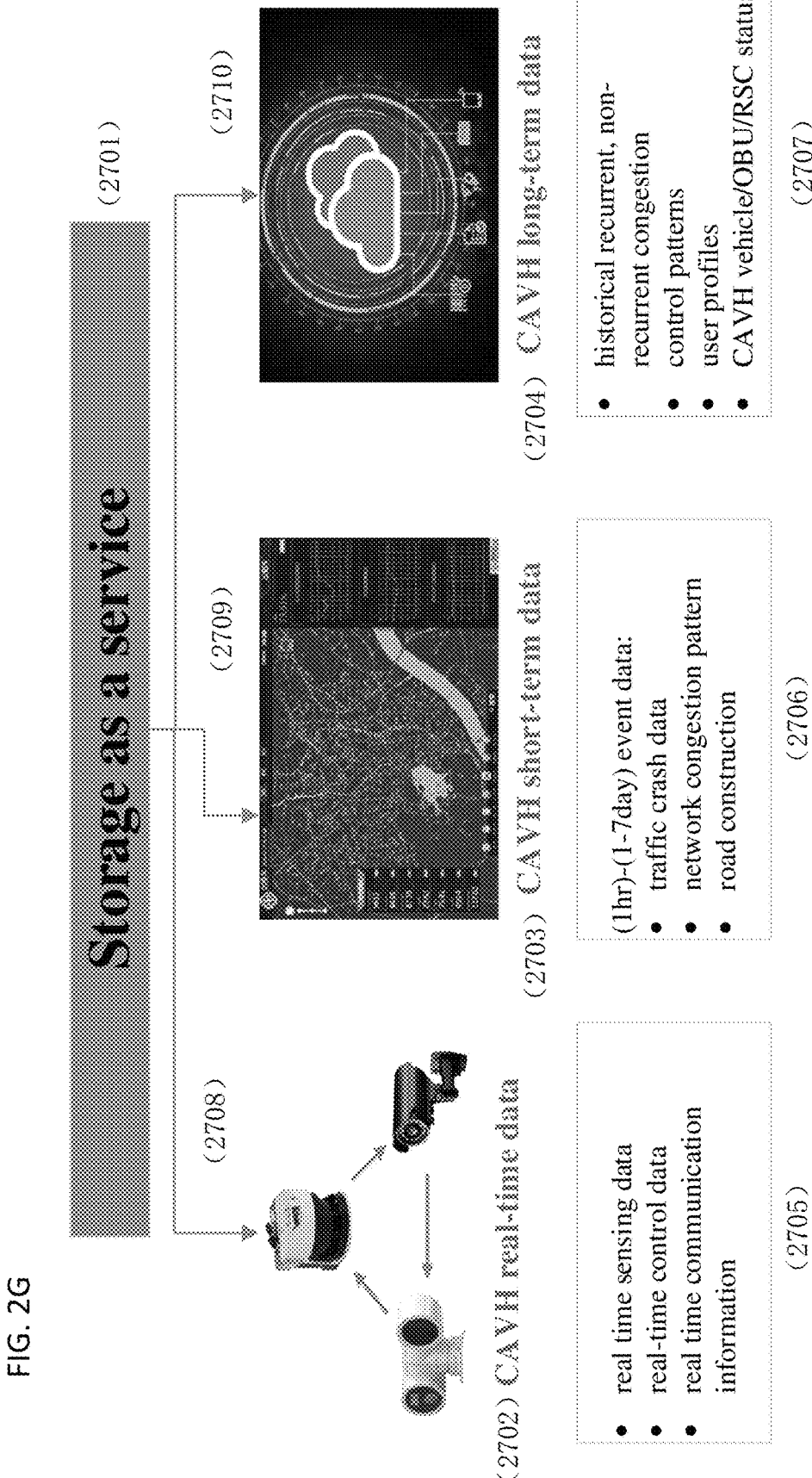

FIG. 2G is a schematic drawing showing an embodiment of the Storage as a Service CAVH cloud based service. Features of embodiments of the technology shown in FIG. 2G include, e.g., 2701: Storage as a Service central storage control system; 2702: Storage as a Service CAVH real-time data system; 2703: Storage as a Service CAVH short-term data system; 2704: Storage as a Service CAVH long-term data system; 2705: Storage sub-systems for CAVH real-time data; 2706: Storage sub-systems for CAVH short-term data; 2707: Storage sub-systems for CAVH long-term data; 2708: Central system to CAVH real-time data system communication; 2709: Central system to CAVH short-term data system communication; and 2710: Central system to CAVH long-term data system communication.

Figure 2H:
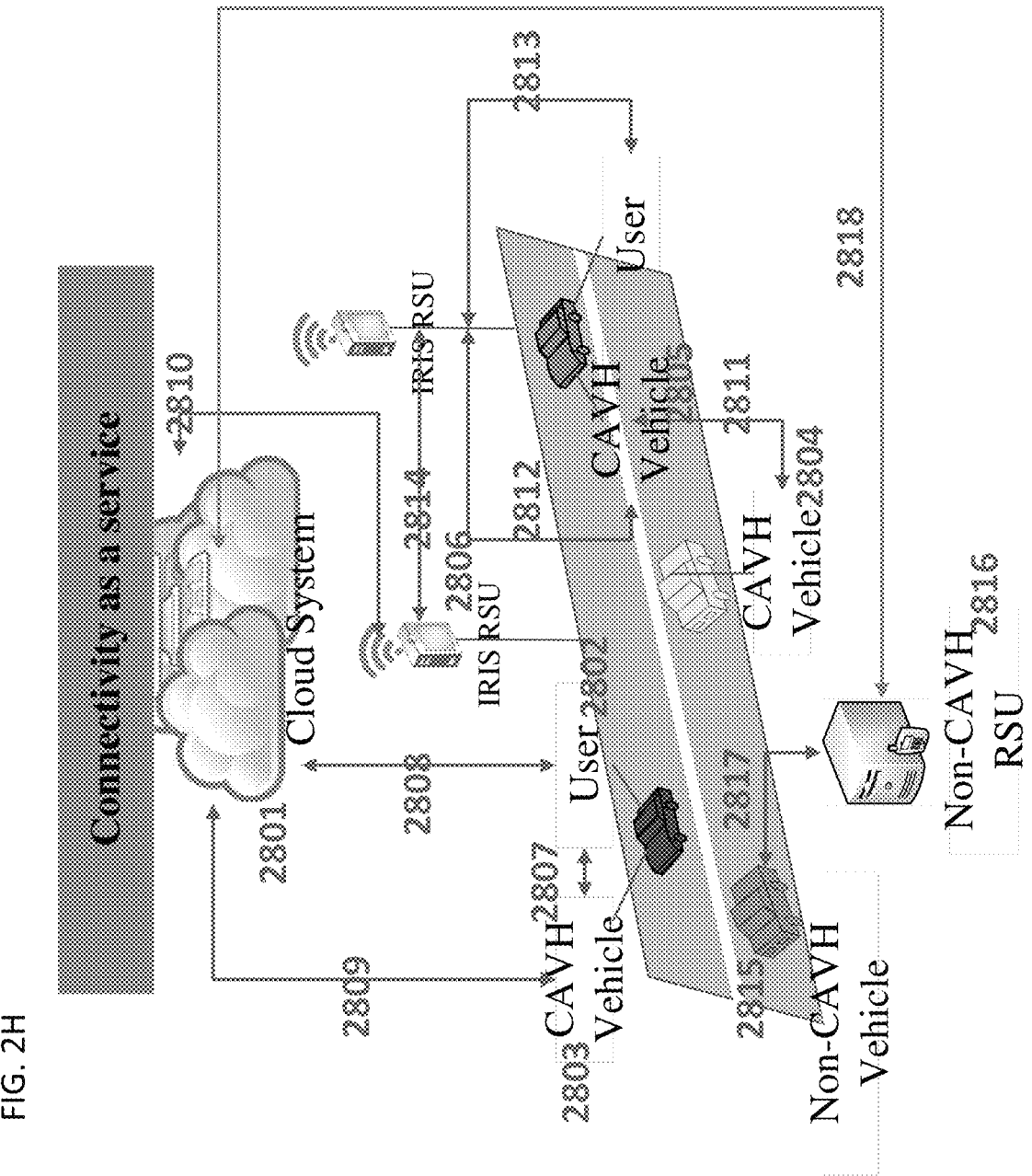

FIG. 2H is a schematic drawing showing an embodiment of the Connectivity as a Service CAVH cloud based service. Features of embodiments of the technology shown in FIG. 2H include, e.g., 2801: CAVH Cloud System; 2802: CAVH User; 2803: CAVH Vehicle with full connection; 2804: CAVH Vehicle with only V2V connection; 2805: CAVH Vehicle with only V2I Connection; 2806: CAVH IRIS RSU; 2807: Vehicle-to-User Communication; 2808: User-to-Cloud System Communication; 2809: Vehicle-to-Cloud System Communication; 2810: IRIS RSU-to-Cloud System Communication; 2811: Vehicle-to-Vehicle Communication; 2812: Vehicle-to-IRIS RSU Communication; 2813: User-to-IRIS RSU Communication; 2814: IRIS RSU-to-IRIS RSU Communication; 2815: Non-CAVH Vehicle; 2816: Non-CAVH Infrastructure RSU; 2817: Non-CAVH Vehicle-to-Infrastructure Communication; and 2818: Non-CAVH Infra-structure-to-CAVH Cloud System Communication.

Figure 3:
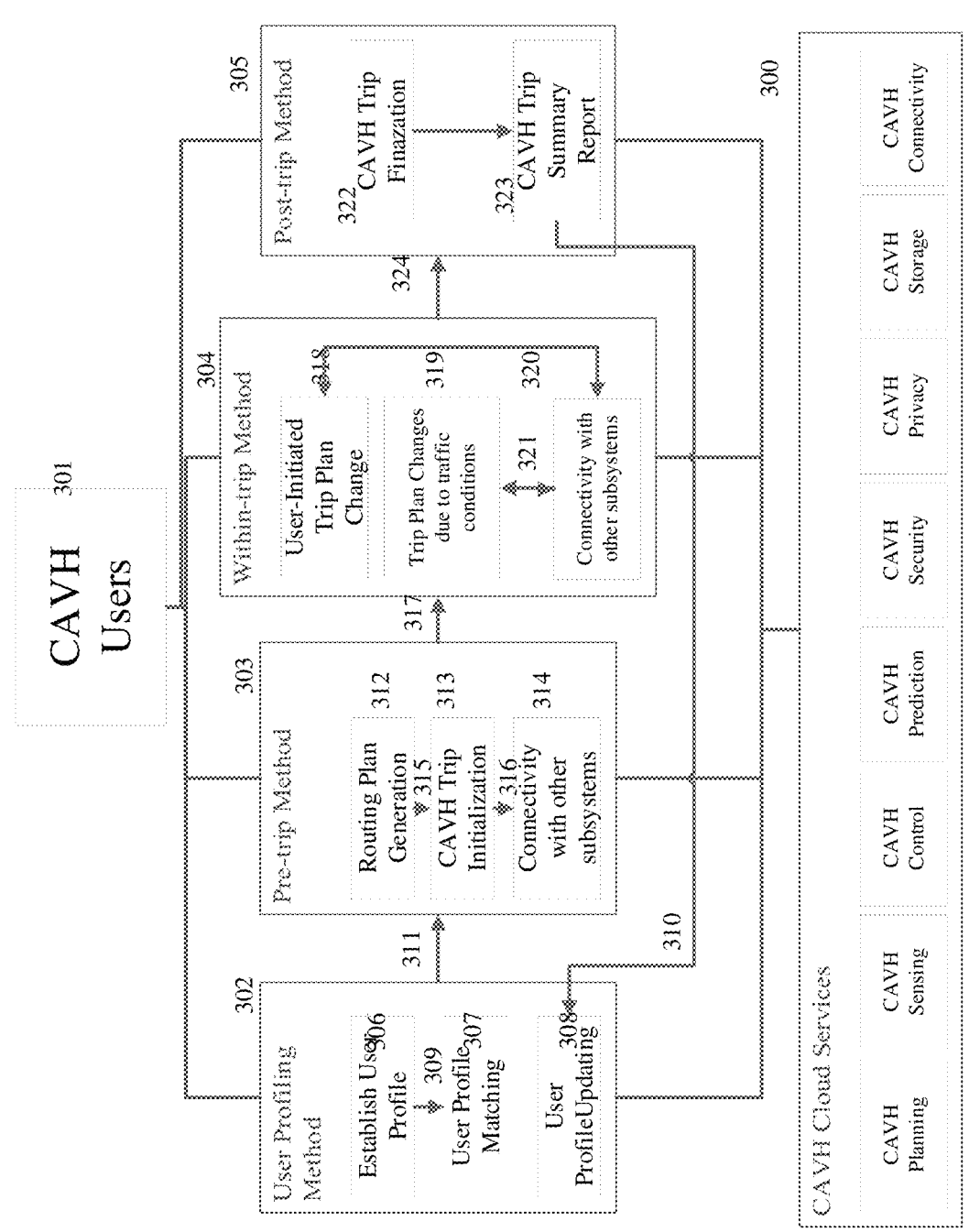

FIG. 3 is a schematic drawing showing an embodiment of the user-end functionalities of the CAVH cloud. Features of embodiments of the technology shown in FIG. 3 include, e.g., 300: CAVH Cloud Services; 301: CAVH Users; 302: User Profiling Method; 303: Pre-trip user activity planning; 304: within-trip user activity planning; 305: post-trip user activity planning; 306: Profiling—establish user behavioral groups; 307: Profiling—match user behavior types; 308: Profiling—update user behavioral group profiles; 309: Pro-filing+Post-trip—User post-trip summary report for user profiling; 310: Pre-trip—Generate routing plan; 311: Pre-trip—Initialize the upcoming CAVH Trip; 312: Pre-trip—Connect with other subsystems; 313: Pre-trip+Profiling—Trip plan generation based on user profile; 314: Within-trip—Trip plan change initiated by users; 315: Within-trip—Trip plan change due to traffic condition; 316: Within-trip—Connect with other subsystems to implement trip plan changes; 317: Within-trip—Get traffic condition through connectivity with other systems and change the trip plan; 318: Within-trip+profiling—User-initiated plan change is based on user profiles and instant trip demand; 319: Post-trip—Finalize the CAVH trip; and 320: Post-trip—Generate trip summary report.

Figure 4:
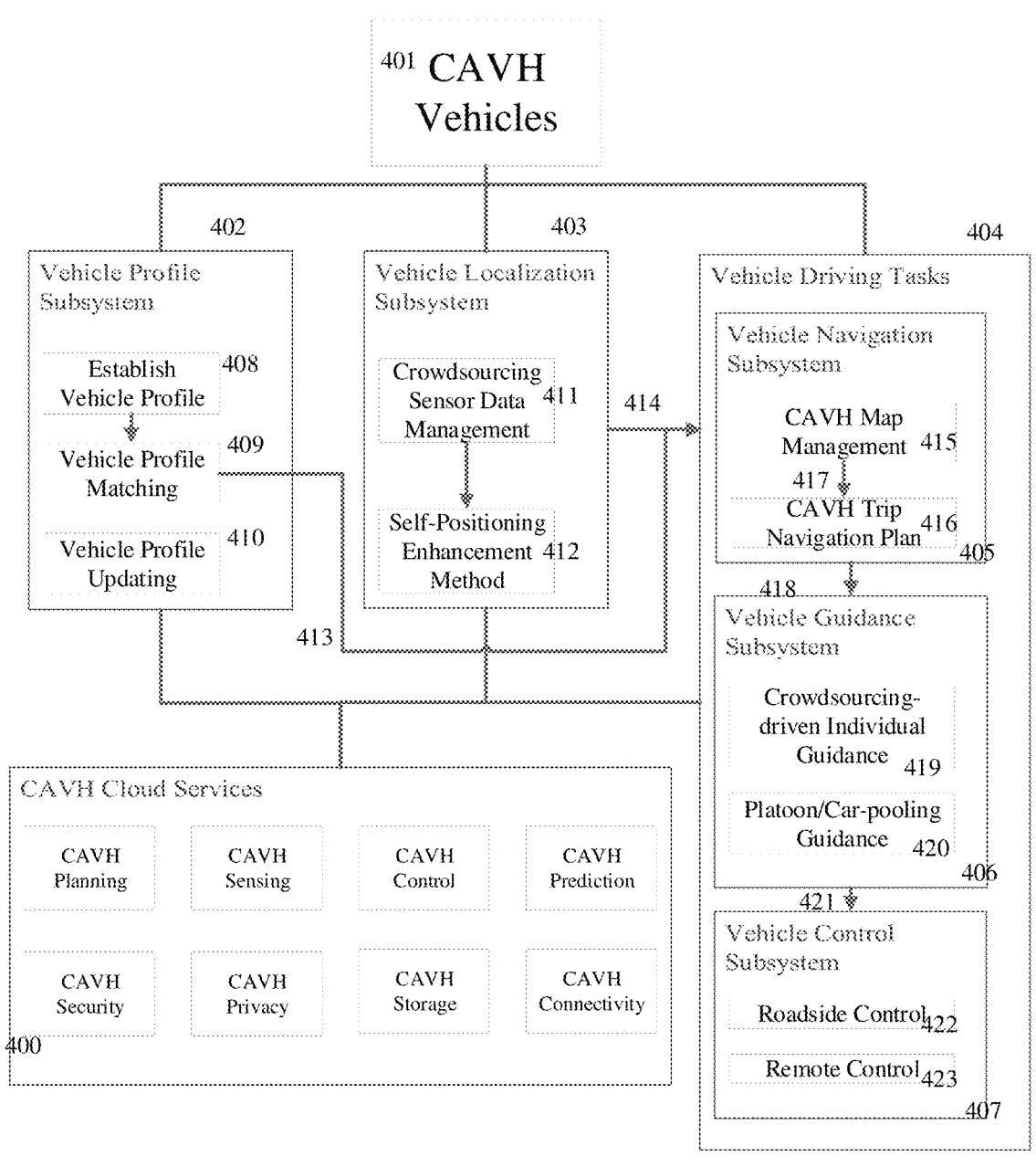

FIG. 4 is a schematic drawing showing an embodiment of the vehicle-end functionalities of the CAVH cloud. Features of embodiments of the technology shown in FIG. 4 include, e.g., 400 CAVH Cloud Services; 401: CAVH Vehicles; 402: Vehicle Profiling Subsystem; 403: Vehicle Localization Sub-system; 404: Vehicle Driving Tasks (GNC); 405: Vehicle Navigation Subsystem; 406: Vehicle Guidance Subsystem; 407: Vehicle Control Subsystem; 408: Profiling—Establish Vehicle Profile; 409: Profiling—Match Vehicle Profile and identify vehicle feature types; 410: Profiling—Update vehicle profile; 411: Localization-Manage the crowdsourc-ing sensor data; 412: Localization-Enhanced self-position-ing using the crowdsourcing sensor data to enhance the self-positioning; 413: Using the vehicle profile/type to sup-port the implementation of vehicle driving tasks including trip navigation plan and the consequential guidance/control; 414: Using the enhanced self-positioning for CAVH map management, navigation, guidance, and control; 415: Navigation—Manage CAVH maps; 416: Navigation—Generate CAVH trip navigation plan; 417: Using CAVH maps for the generation of trip navigation plan; 418: Guidance is imple-mented for CAVH vehicle to fulfill the navigation plan; 419: Guidance—The guidance for individual CAVH vehicle to fulfill its own driving task; 420: Guidance—The guidance for grouped CAVH vehicles to fulfill the platoon/car-pooling driving task; 421: Enhanced vehicle control signals to fulfill the vehicle guidance; 422: Control—Road-side vehicle con-trol enhancement; and 423: Control—Cloud remote control in special events.

Figure 5:
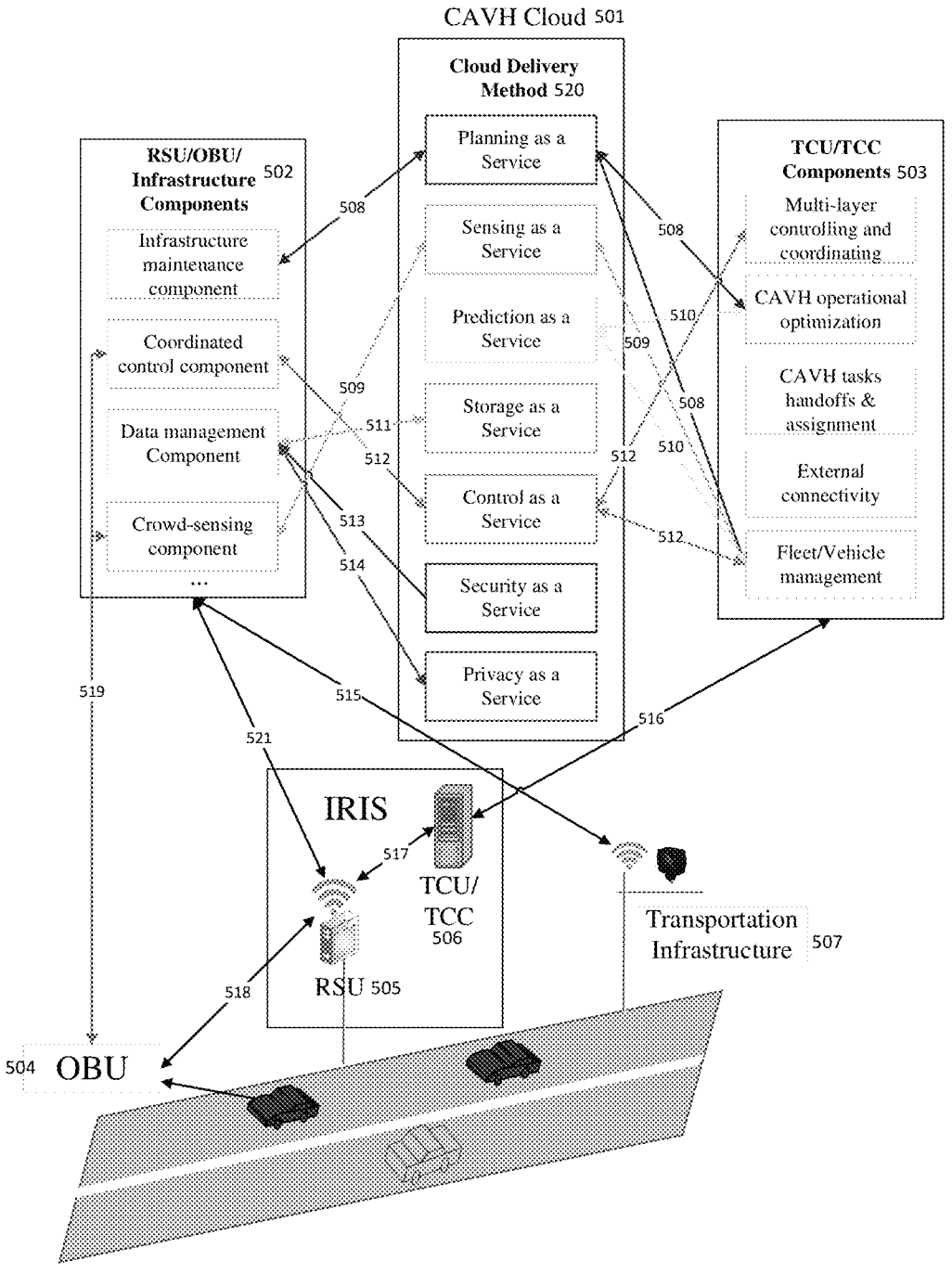

FIG. 5 is a schematic drawing showing an embodiment of the CAVH infrastructure functionalities enabled by CAVH Cloud. Features of embodiments of the technology shown in FIG. 5 include, e.g., 501: CAVH Cloud; 502: Cloud based—RSU/OBU/Infrastructure subsystem components such as infrastructure maintenance, coordinated control, data man-agement, crowd-sensing components; 503: Cloud based—TCU/TCC subsystem components such as multi-layer con-trolling and coordinating, CAVH operational optimization, external connectivity, etc; 504: On-board Unit that controls and coordinates vehicle in CAVH system with the help of CAVH Cloud; 505: Road Side Unit that receives data flow from connected vehicles, detect traffic conditions, and sends targeted instructions to vehicles; 506: Traffic Control Unit/Traffic Control Center covering a small freeway area, ramp metering, or intersections that focus on data gathering, traffic signals control, and vehicle requests processing; 507: Trans-portation Infrastructures such as video camera, dynamic traffic signs; 508: Data flow between components and Cloud Planning as a Service Method including routing, vehicle dispatching, emergency plans, etc; 509: Data flow between components and Cloud Sensing as a Service Method includ-ing local and global sensing data etc; 510: Data flow between components and Cloud Prediction as a Service Method including optimal speed prediction, failure predic-tion instructions, etc; 511: Data flow between components and Cloud Storage as a Service Method including real-time data, short-term data, long-term data etc; 512: Data flow between components and Cloud Control as a Service Method including speed, merging, parking instructions, etc; 513: Data flow between components and Cloud Security as a Service Method including cyber security method etc. 514: Data flow between components and Cloud Privacy as a Service Method including user profile, travel trajectory, trip schedule, etc; 515: Data flow between components and transportation infrastructure including feedbacks, instruc-tions, sensor data, etc; 516: Data flow between components and TCC/TCU including instructions and fused data; 517: Communication between TCU/TCC and RSU; 518: Com-munication between RSU and OBU; 519: Data flow between components and OBU including instructions and feedbacks; 520: CAVH Cloud delivery methods such as prediction as a service, control as a service, etc; and 521: Data flow between components and RSU including instructions, fused data, etc.

Figure 6:
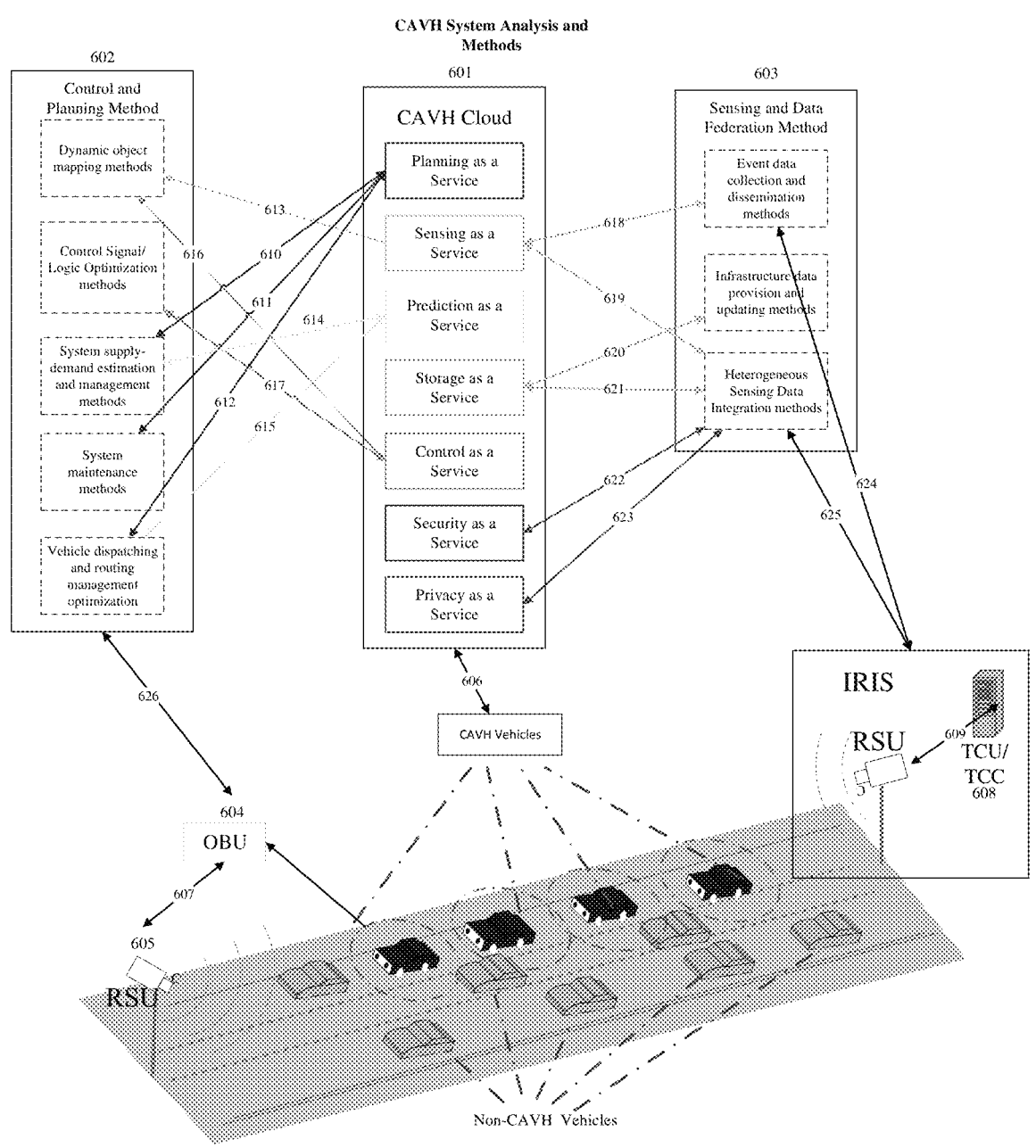

FIG. 6 is a schematic drawing showing an embodiment of the CAVH cloud-based system analytic and optimization methods. Features of embodiments of the technology shown in FIG. 6 include, e.g., 601: CAVH Cloud; 602: Cloud-based-Control and Planning Methods; 603: Cloud based-Sensing and Data federation Methods; 604: On-board Unit; 605: Road Side Unit; 606: CAVH Vehicles connect with Cloud services; 607: Communication between RSU and OBU; 608: Traffic Control Unit/Traffic Control Center; 609: Communication between TCU/TCC and RSU; 610: System Supply-demand estimation and management method Sup-ported by Cloud Planning as a Service; 611: System Maintenance Methods Supported by Cloud Planning as a Service; 612: Vehicle dispatching and routing management optimization Supported by Cloud Planning as a Service; 613: Dynamic Object Mapping Method Supported by Cloud Sensing as a Service; 614: System Supply-demand estimation and management Supported by Cloud Prediction as a Service; 615: Vehicle dispatching and routing management optimization Supported by Cloud Prediction as a Service; 616: Dynamic Object Mapping Method Supported by Cloud Control as a Service; 617: Control Signal/Logic Optimization Method Supported by Cloud Control as a Service; 618: Event data collection and dissemination methods Supported by Cloud Sensing as a Service; 619: Heterogeneous Sensing Data Integration Method Supported by Cloud Storage as a Service; 620: Infrastructure data provision and updating method supported by Cloud Storage as a Service; 621: Heterogeneous Sensing Data Integration Method Supported by Cloud Storage as a Service; 622: Heterogeneous Sensing Data Integration Method Supported by Cloud Security as a Service; 623: Heterogeneous Sensing Data Integration Method Supported by Cloud Privacy as a Service; 624: Communication between Event data collection and dissemination methods and TCC/TCU; 625: Communication process between Heterogeneous Sensing Data Integration Method and TCC/TCU; and 626: Communication between System control and planning methods with OBU.

FIG. 7 is a schematic drawing showing an embodiment of the CAVH cloud data computing and management methods. Features of embodiments of the technology shown in FIG. 7 include, e.g., 701: CAVH Cloud; 702: Traffic Management Center; 703: Traffic Control Unit/Traffic Control Center; 704: On-board Unit; 705: Road Side Unit; 706: Communication between OBU and RSU; 707: Data flow between CAVH vehicle and Corridor-level data aggregation and integration; 708: Data flow between CAVH vehicle and Link-level data aggregation and integration; 709: Data flow between CAVH vehicle and Node-level data aggregation and integration; 710: Data flow between CAVH vehicle and Vehicle-level data aggregation and integration; 711: CAVH Cloud data services supported by Network-Level data aggregation and integration method; 712: Communication between Network-Level data aggregation and integration Method and CAVH Cloud; 713: Communication between CAVH Cloud service and Link-Level data aggregation and integration; 714: Data Exchange between Network-Level data aggregation and CAVH Cloud; 715: CAVH Cloud Service supported by Corridor-Level data aggregation and integration; 716: Data storage for Network-Level data aggregation and integration through CAVH Cloud Service; 717: Data storage for Corridor-Level Data Integration and Aggregation; 718: Data storage for Link-Level data integration and aggregation through CAVH Cloud Service; 719: Data storage for Node-Level data aggregation and integration through CAVH Cloud Service; 720: CAVH Cloud Service Supported by Node-level data integration and aggregation; 721: CAVH Cloud Service Supported by Vehicle-Level data Integration and aggregation; 722: Vehicle-Level data integration and aggregation controlled by CAVH Cloud Service; 723: Node-level data integration and aggregation controlled by CAVH Cloud Service; 724: Vehicle-level data integration and aggregation controlled by CAVH Cloud Service; 725: Communication between Vehicle-level Data and Node-level data; 726: Communication between Node-level and Link-level data; 727: Communication between Link-level data and Corridor-level data; 728: Communication between Corridor-level data and network-level data; 729: Data exchange between Traffic Management Center and Network-Level data; 730: Data exchange between Traffic Management Center and Corridor-Level data; 731: Data exchange between Traffic Management Center and Link-Level data; 732: Data exchange between Traffic Management Center and Node-level data; and 733: Communication between Traffic Management Center and TCU/TCC.

Figure 8:
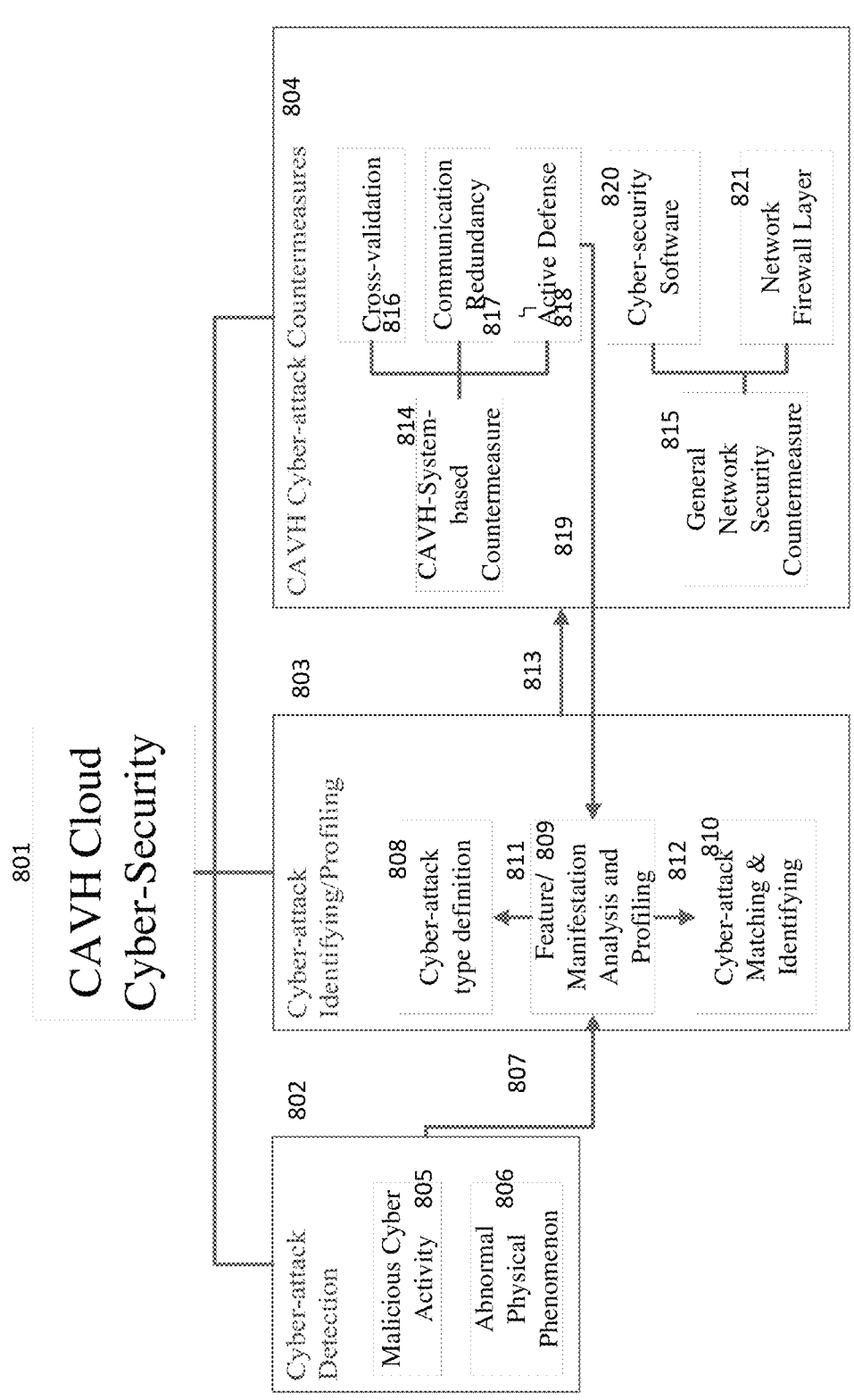

FIG. 8 is a schematic drawing showing an embodiment of the CAVH cloud based security methods. Features of embodiments of the technology shown in FIG. 8 include, e.g., 801: CAVH Cloud Cyber Security System; 802: The method to detect cyber-attacks; 803: The method to profile and identify cyber-attack; 804: CAVH System-based Cyber-attack countermeasures; 805: Cyber-attack detection method through malicious cyber activity; 806: Cyber-attack detection method through abnormal physical phenomenon; 807: Profile and identify cyber-attack based on the detected activities; 808: The definition of cyber-attack types through their features and manifestation; 809: Analyze and profile the detected suspicious activities; 810: Match and/or identify the cyber-attacks; 811: Update the cyber-attack type definition per the feature/manifestation analysis; 812: Match the features and manifestations of suspicious activities to the defined cyber-attacks, or identify the new cyber-attacks; 813: Implement countermeasures to the cyber-attacks; 814: The countermeasures implemented by CAVH system against the attacks to the system; 815: The countermeasures implemented by software/hardware firewall against the attack to the communication network; 816: Cross-validation countermeasures against "fake information" attacks; 817: Communication Redundancy as countermeasure to communication-aimed attacks; 818: Active Defense as countermeasure to non-defined new attack types; 819: Active defenses is based on feature/manifestation analysis/profiling, and sends feedback to update the profiling database; 820: Software solution to protect CAVH network communication; and 821: Hardware solution to protect CAVH network communication.

Figure 9:
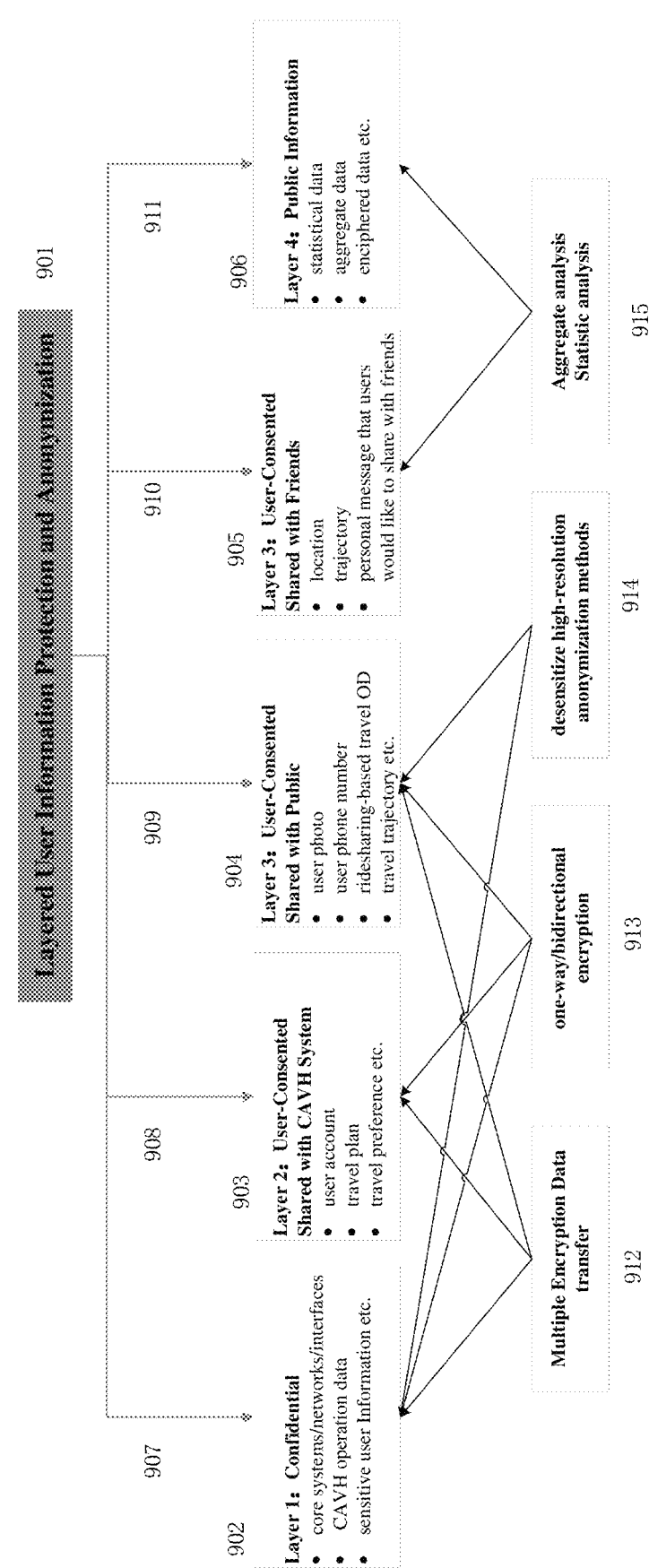

FIG. 9 is a schematic drawing showing an embodiment of the CAVH cloud based privacy protection methods. Features of embodiments of the technology shown in FIG. 9 include, e.g., 901: layered user information protection and anonymization central control system; 902: Confidential layer system; 903: User-consented shared with CAVH system layer system; 904: User-consented shared with public layer system; 905: User-consented shared with friends layer system; 906: Public information layer system; 907: Central control system to Confidential layer communication; 908: Central control system to User-consented shared with CAVH system layer communication; 909: Central control system to User-consented shared with public layer communication; 910: Central control system to User-consented shared with friends layer communication; 911: Central control system to Public information layer communication; 912: Multi encryption data transfer methods; 913: One-way/bidirectional encryption methods; 914: Desensitize high-resolution anonymization methods; and 915: Aggregate analysis and statistical analysis methods.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to a cloud-based system for a connected and automated vehicle highway (CAVH) system. In some embodiments, the CAVH cloud services and their interactions with CAVH system components provide a range of system functionalities including but not limited to connectivity, sensing, control, planning, maintenance, security, and privacy protection.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Provided herein is technology relating to a cloud-based system for a connected and automated vehicle highway (CAVH) system. In some embodiments, the CAVH cloud services and their interactions with CAVH system components provide a range of system functionalities including but not limited to connectivity, sensing, control, planning, maintenance, security, and privacy protection.

Figure 1:
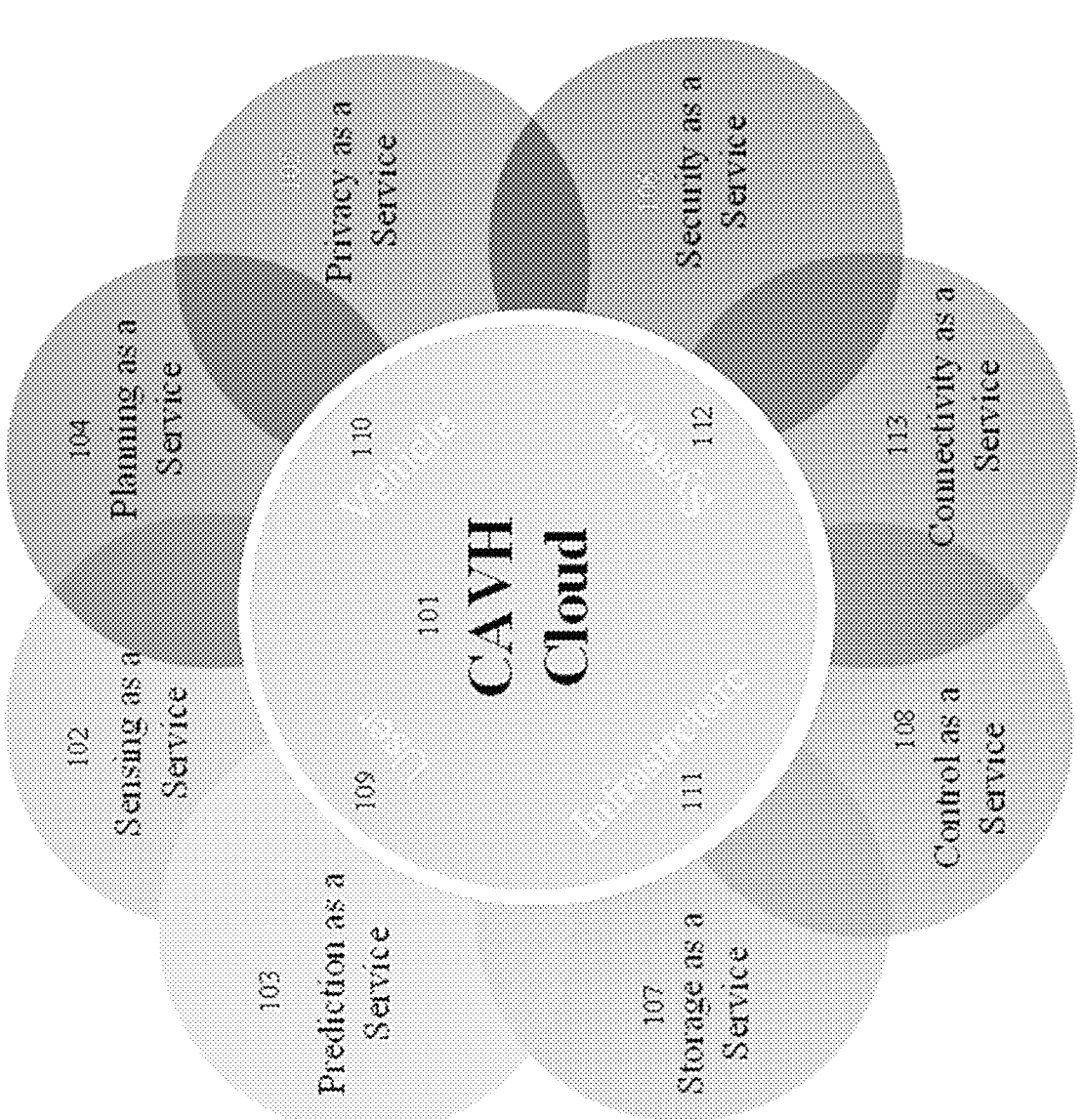
FIG. 1 is a schematic drawing showing an embodiment of the CAVH cloud system design and component services. Features of embodiments of the technology shown in FIG. 1 include, e.g., 101: CAVH Cloud Computational Architecture; 102: CAVH Sensing as a Service; 103: CAVH Prediction as a Service; 104: CAVH Planning as a Service; 105: CAVH Privacy as a Service; 106: CAVH Security as a Service; 107: CAVH Storage as a Service; 108: CAVH Control as a Service; 109: CAVH user end; 110: Vehicle end including CAVH and non-CAVH vehicles; 111: Infrastructure end including IRIS and transportation infrastructure; 112: CAVH system and services; and 113: CAVH Connectivity as a Service.

In some embodiments, as shown in FIG. 1, the technology comprises a CAVH Cloud platform 101, e.g., residing in a CAVH system. In some embodiments, the CAVH cloud services interact with, e.g., CAVH users, vehicles (e.g., CAVH and non-CAVH vehicles), CAVH intelligent road infrastructure systems (IRIS), general transportation infrastructures, and/or the CAVH core system and services for automated driving. In some embodiments, the CAVH cloud services comprise one or more of the following exemplary service-delivering methods: sensing as a service 102 that uses the CAVH cloud to integrate and manage the perception of CAVH driving environment; prediction as a service 103 that uses the computational capability of the CAVH cloud to make predictions on supply-demand patterns, system, and service conditions; planning as a service 104 that focuses on the use of CAVH computing to plan for CAVH operations, fleet management, and system configurations; privacy as a service 105 that protects user privacy through layered access and aggregated profiling; security as a service 106 that detects, identifies, and counters cyber attacks on CAVH systems; storage as a service 107 that stores vehicle and infrastructure data with different terms for usage needs; control as a service 108 that supports different CAVH control levels and modes; and connectivity as a service 113 that supports the interaction and communication within different CAVH components.

In some embodiments, as shown in FIG. 2A, the technology comprises a CAVH Planning as a Service system. In some embodiments, the system comprises systems including, but not limited to a central control system 2101, user system 2102, vehicle system 2103, infrastructure system 2104, and network system 2105. In some embodiments, the central control system controls and communicates with the user system, vehicle sub-system, infrastructure sub-system, and/or network sub-system. In some embodiments, the sub-systems of the user system 2106 comprise: a) a Preferred path planning sub-system; b) a preferred Travel Mode/public transit planning sub-system; c) a Preferred toll way planning sub-system; and/or d) a POI recommendation planning sub-system. In some embodiments, the sub-systems of the vehicle system 2107 comprise: a) a departure time planning sub-system; b) a destination choice planning sub-system; c) a Short term route planning sub-system; d) a vehicle dispatching planning sub-system; and/or c) an Emergency Solution planning sub-system.

In some embodiments, as shown in FIG. 2B, the technology comprises a CAVH Sensing as a Service system. In some embodiments, the system comprises systems including but not limited to a central sensing control system 2101, Heterogeneous sensing system 2202, Local and global sensing system 2203, Crowd and multi-perspective sensing system 2204, and Network Sensing 2205. In some embodiments, the central sensing control system controls and communicates with the Heterogeneous sensing system, Local and global sensing system, Crowd and multi-perspective sensing system, and/or Network Sensing. In some embodiments, the sub-systems of Heterogeneous sensing system 2206 comprise, e.g., computer vision, radar, LiDAR, and/or sensors with different sensing characteristics such as sensing resolution, sensor type, sensing coverage, and/or sensing frequencies. In some embodiments, the sub-systems of Local and global sensing system 2207 comprise integration of local sensing on vehicle operations and global sensing on CAVH and transportation network. In some embodiments, the sub-systems of Crowd and multi-perspective sensing system 2208 comprise crowd and multi-perspective sensing through multiple CAVH vehicle-based and/or roadside sensors. The sub-systems of Network Sensing 2209 include connecting to external data sources for emergency management, multi-modal integration, and travel demand forecasting.

In some embodiments, as shown in FIG. 2C, the technology comprises a CAVH Control as a Service system. In some embodiments, the system comprises systems including but not limited to: a central control system 2301, CAVH Local Link system 2302, CAVH Corridor system 2303, CAVH Global network system 2304, and CAVH Remote Link system 2305. In some embodiments, the Central control system controls and communicates with the Local Link sub-system, Corridor sub-system, Global network sub-system, and/or Remote Link sub-system. In some embodiments, the sub-systems of CAVH Local Link system 2306 comprise one or more of: a) Enabled coordinated control and/or b) Extending basic CAVH control (local sensing/control gap). In some embodiments, the sub-systems of Corridor system 2307 comprise: a) Non-coordinated control b) Vehicle control with non-CAVH vehicles; and/or c) Interaction with VANET/mobility service systems. In some embodiments, the sub-systems of Global network system 2308 comprise: a) Detouring Control, b) Congestion avoidance approaching, c) Parking control, and/or d) First & last mile travel control. In some embodiments, the sub-systems of Remote Link system 2309 comprise Enabled remote takeover of CAVH vehicle controls during emergency, local system failures, etc.

In some embodiments, as shown in FIG. 2D, the technology comprises a CAVH Prediction/Analytic as a Service system. In some embodiments, the system comprises systems including but not limited to: central prediction control system 2401, CAVH Vehicle system 2402, CAVH Corridor system 2403, and/or CAVH Global network system 2404. In some embodiments, Central prediction control system controls and communicates with, e.g., the Vehicle sub-system, Corridor sub-system, and/or Global network sub-system. In some embodiments, the sub-systems of CAVH Vehicle system 2405 comprise: a) Vehicle mechanical status analysis and failure prediction (e.g., for failure prediction related brakes, tires, engine, fuel, etc.); b) Optimal speed prediction; c) Optimal travel acceleration; and/or d) Emergency detection. In some embodiments, the sub-systems of Corridor system 2406 comprise: a) Road traffic condition detection (e.g., intersection, uplink and downlink); b) Optimal travel lane and lane changing strategy analysis, c) aggressive vehicle detection, and/or d) Emergency detection. In some embodiments, the sub-systems of Global network system 2407 comprise: a) Busy area and busy time prediction, b) Thing-to-do suggestion based on traffic condition, c) Optimal travel route, d) Optimal travel time, and/or e) Optimal parking lot.

In some embodiments, as shown in FIG. 2E, the technology comprises CAVH Security as a Service system. In some embodiments, the system comprises systems including but not limited to: central security control system 2501, User/operator/manager/developer system 2502, system components cyber-security system 2503, and/or security interfaces with other services system 2504. In some embodiments, Central security control system controls and communicates with the User/operator/manager/developer sub-system, system components cyber-security sub-system, and/or security interfaces with other services sub-system. In some embodiments, the sub-systems of CAVH User/operator/manager/developer system 2505 comprise: a) layered system access control, b) function-based system/interface access control, and/or c) Access formal procedures. In some embodiments, the sub-systems of system components cyber-security system 2506 comprises: a) physical attack protection (e.g., vehicle, infrastructure), b) network attack protection (e.g., systems, cyber activities). In some embodiments, the sub-systems of security interfaces with other services system 2507 comprises: a) CAVH planning service, b) CAVH control service, and/or c) CAVH data storage service.

In some embodiments, as shown in FIG. 2F, the technology comprises a CAVH privacy as a Service system. In some embodiments, the system comprises systems including but not limited to: central privacy control system 2601, user system 2602, vehicle system 2603, and local and global data system 2604. In some embodiments, Central privacy control system controls and communicates with the user sub-system, vehicle sub-system, and local and global data sub-system. In some embodiments, the sub-systems of user system 2605 comprise: a) user profile privacy sub-system, b) user preference privacy sub-system, and/or c) user transaction records privacy sub-system. In some embodiments, the sub-systems of vehicle system 2606 comprise: a) travel trajectory privacy sub-system, b) trip origin and destination (OD) privacy sub-system, and/or c) travel schedule privacy sub-system. In some embodiments, the sub-systems of local and global data system 2607 including: a) data collection privacy sub-system, b) data storage privacy sub-system, and/or c) leveled data access control privacy sub-system.

In some embodiments, as shown in FIG. 2G, the technology comprises CAVH storage as a Service system. In some embodiments, the system comprises systems including: central storage control system 2701, real-time data system 2702, short-term data system 2703, and long-term data system 2704. In some embodiments, Central storage control system controls and communicates with the real-time data sub-system, short-term data sub-system, and/or and long-term data sub-system. In some embodiments, the sub-systems of real-time data system 2705 comprise: a) real-time sensing data storage sub-system, b) real-time control data storage sub-system, and/or c) real-time communication information storage sub-system. In some embodiments, the sub-systems of short-term data system 2706 comprise: a) storage sub-system, b) traffic crash data storage sub-system, c) network congestion pattern storage sub-system, d) road construction storage sub-system, e.g., to store event data from the past 1-hour interval (e.g., approximately 1 to 60 minutes, e.g., 1, 5, 10, 15, 20, 25, 30, 35, 40, 45, 50, 55, or 60 minutes) to past 1-day interval (e.g., approximately 1 to 12 to 24 hours, e.g., 1, 2, 3, 4, 5, 6, 7, 8, 9, 10, 11, 12, 13, 14, 15, 16, 17, 18, 19, 20, 21, 22, 23, or 24 hours) to past 1-week interval (e.g., approximately 1 to 7 days, e.g., 0.5, 1, 1.5, 2, 2.5, 3, 3.5, 4, 4.5, 5, 5.5, 6, 6.5, or 7 days). In some embodiments, the sub-systems of long-term data system 2707 comprise: a) historical recurrent, congestion storage sub-system, nonrecurrent congestion storage sub-system, b) control patterns storage sub-system, c) user profiles storage sub-system, and/or d) CAVH vehicle/OBU/RSC status storages sub-system.

In some embodiments, as shown in FIG. 2H, the technology comprises a CAVH Cloud connectivity service. In some embodiments, the CAVH Cloud connectivity service provides communication between one or more components in the CAVH cloud environment including but not limited to CAVH cloud system 2801; CAVH users 2802; CAVH vehicles (e.g., comprising differential accessibility to communication) 2803, 2804, 2805; CAVH IRIS roadside units 2806; non-CAVH vehicle 2815; and non-CAVH infrastructure roadside units 2816. In some embodiments, the connectivity between components comprises one or more of, e.g., vehicle-to-user communication 2807, user-to-cloud system communication 2808, vehicle-to-cloud system communication 2809, IRIS RSU-to-cloud system communication 2810, vehicle-to-vehicle communication 2811, vehicle-to-IRIS communication 2812, user-to-IRIS communication 2812, IRIS-to-IRIS communication 2814, non-CAVH vehicle-to-Non-CAVH RSU communication 2817, and/or non-CAVH RSU-to-CAVH cloud system communication 2818.

In some embodiments, as shown in FIG. 3, the technology comprises a CAVH Cloud-based user-end system. In some embodiments, the user-end system comprises one or more of the following: CAVH Cloud Services 300, CAVH users 301, user profiling methods 302, pre-trip user activity planning method 303, within-trip user activity planning method 304, and/or post-trip user activity planning method 305. In some embodiments, CAVH cloud services 300 support on or more of user end methods. In some embodiments (e.g., for user profiling methods), the cloud generates user profiles 306 based on the analysis and aggregation of individual information, trip demands, travel preference, and past experiences of CAVH system usage. In some embodiments, the information used to generate the user profile is classified in different privacy levels as:

1. High-privacy user individual data including, e.g., encrypted user identification, vehicle ownership, emergency information, etc. for emergency and potential public security purpose;

2. Medium-privacy user data including, e.g., generic user type definition, CAVH vehicle ownership and service types, travel preference types, CAVH service preference types, and other aggregated user behavioral pattern types; or 3. Low-privacy user data including, e.g., instant trip demand, instant driving data, etc.

In some embodiments, the profiling methods match the aggregated user profile to the user types 307, which manifests the features of the user's trip. In some embodiments, a profile updating method 308 is included to update the user profile based on the summary of the trip 323. In some embodiments, based on the user profile and the instant trip demand, the routing plan 312 is generated and initialized 313 by pre-trip methods 303. In some embodiments, the routing plan regards, e.g., the path choices, priority lane accessibility, tollway preference, specific midway locations, and multi-mode trip chain, etc. In some embodiments, connectivity with the other subsystems 314 is involved to implement the routing plan. In some embodiments, the user initiates a change in the routing plan during a CAVH trip (e.g., as a result of a change of preference) 318—in some embodiments, based on information from the connectivity of other subsystems 320. In some embodiments, the trip plan is changed due to a change in a traffic condition (e.g. bus schedule, detour, etc.) 319 based on information from the connectivity of the other subsystems 320. In some embodiments, the CAVH trip is finalized 322 and a summary of the trip 323 is conducted by post-trip method if the trip plan is fulfilled.

In some embodiments, as shown in FIG. 4, the technology comprises a CAVH Cloud-based vehicle-end system. In some embodiments, the vehicle-end system comprises one or more of the following components: CAVH Cloud Services 400, CAVH vehicles 401, vehicle profiling subsystem 402, localization subsystem 403, and/or vehicle driving tasks 404. In some embodiments, vehicle driving tasks 404 comprise one or more of, e.g., navigation subsystem 405, guidance subsystem 406, and control subsystem 407. In some embodiments, CAVH cloud services 400 support the one or more of the vehicle end subsystems. In some embodiments, a vehicle profile subsystem manages vehicle profiles including:

1. static profiles such as, e.g., identification, mechanical feature, historical and statistic driving records, CAVH automation level, and available CAVH devices, etc.;

2. dynamic profiles such as, e.g., vehicle dynamic status (e.g., speed, acceleration, GPS location etc.), on-board sensor data, and other instantaneous mission-critical data; and 3. CAVH services profiles such as lane accessibility, CAVH priority, current CAVH trip' mission profile, and path plan in use.

In some embodiments, the vehicle localization subsystem 403 manages crowdsourcing sensor data 411 to provide and/or improve the self-positioning of vehicle 412. In some embodiments, the vehicle profiles and enhanced localization assist implementing vehicle driving tasks 404. For instance, in some embodiments, the driving tasks comprise three layers:

1. Navigation subsystem 405 manages CAVH maps 415 (e.g., including traffic environment and CAVH facilities maps) and generates navigation plan 416 (e.g., route planning on the CAVH map);

2. Guidance subsystem 406, which supports the speed and path response of individual vehicles 419 based on crowdsourcing sensor data and supports the coordinated speed and path response 420 to fulfill CAVH platoon and car-pooling services; and 3. Control subsystem 407, which supports roadside vehicle control 422 through providing adjustment to the second-to-second vehicle control information and fulfill remote vehicle control 423 in emergency.

In some embodiments, as shown in FIG. 5, the technology provides CAVH Cloud-based infrastructure-end system. In some embodiments, Infrastructure-end system comprises one or more of the following components: CAVH Cloud 501, RSU 505, TCU/TCC 506, OBU 504, and/or transportation infrastructure 507. See, e.g., U.S. patent application Ser. No. 15/628,331, filed Jun. 20, 2017; and U.S. Provisional Patent Application Ser. Nos. 62/626,862, filed Feb. 6, 2018; 62/627,005, filed Feb. 6, 2018; 62/655,651, filed Apr. 10, 2018; and 62/669,215, filed May 9, 2018, the disclosure of each of which is herein incorporated by reference in its entirety.

In some embodiments (e.g., for transportation infrastructure), Cloud employs 515 with data collection, coordinated control, cloud-based sensing data integration, and infrastructure maintenance components 502 from Cloud delivery methods 520. In some embodiments (e.g., a transportation infrastructure that provides additional features and is more powerful for RSUs), Cloud employs 521 data management, crowd-sensing, coordinated control, and infrastructure maintenance components 502 from cloud delivery methods. In some embodiments based on these components, Cloud and RSUs comprise four types of data:

1. Uplink data: Data or information that is: a) collected from RSUs and requested by the cloud; or b) data or information collected from RSUs that RSUs are unable to compute. Uplink data are sent to CAVH Cloud for further planning or control analysis (e.g., LiDAR data, radar data, vehicle location etc.).

2. Downlink data: data or instructions received by an RSU from the CAVH Cloud for control, storage, and/or computing (e.g., video data to compute, log file to store, traffic signal for control).

3. Processing data:
   a) Map Data: By receiving information from RSU/OBU, CAVH Cloud automatically updates a HD static map and aggregates a dynamic map to improve safety for planning and control.
   b) Object/Event Data: When receiving data (e.g., car incident, special event detection, vehicle control instruction), CAVH Cloud records the data to event and system log.
   c) Performance Data: Cloud collects or calculates RSU/OBU performance data for further analysis.
   d) Infrastructure Data: Cloud uses sensed traffic information, e.g., to build a virtual traffic light and send signal instructions to RSUs.
   e) Handoff Data: The Cloud assists RSUs to hand off tasks or data (e.g., vehicle edge control handoff and/or vehicle localization handoff).

4. External data: CAVH cloud communicates with external sources, e.g., to collect and compute useful data and send it to RSU for further analysis (e.g., in some embodiments, Cloud sends speed and location data that are shared by connected vehicles and infrastructures).

Further, as shown in FIG. 5 for TCU/TCC, Cloud comprises employs 516 CAVH operational optimization, multi-layer controlling and coordinating, CAVH tasks handoffs and assignment, external connectivity, and fleet/vehicle management components 503 from cloud delivery methods. In some embodiments that are based on requirements and limitations of TCU/TCC, Cloud provides two types of data:

1. Level-up data: CAVH Cloud collects macroscopic traffic data from lower level for route planning and guidance and for network demand management. In some embodiments, these data are sent to TOC.

2. Level-down data: CAVH Cloud computes and distributes mesoscopic level instructions from upper levels, e.g., platoon control, special event guidance, buffer space, and/or incident detection. In some embodiments, these data are sent to TCU/TCC.

In some embodiments, Cloud combines useful information and coordinates sharing, allocating, and/or backup instructions and fused data in different levels, e.g., for embodiments in which TCUs and TCCs have different resolutions in the system. In some embodiments, Cloud employs 519 coordinated control and crowd-sensing to supports the control of vehicle (e.g., for an OBU).

In some embodiments, as shown in FIG. 6, the technology comprises a CAVH Cloud service 601, e.g., that provides system analytic and/or optimization methods. These methods can be categorized into two groups: 1. Control and planning methods 602; 2. Sensing and data federation methods 603.

In some embodiments, Heterogeneous Sensing Data Integration methods connect to CAVH cloud sensing as a service 619, connect to storage as a service 621, connect to security as a service 622, and/or connect to privacy as a service 623. With CAVH cloud services, in some embodiments the CAVH system integrates heterogeneous sensing data in real time to provide faster and shorter routes for travelers. In some embodiments, the system connects road users with shared traffic information, e.g., to avoid traffic jams, police speed traps, and/or construction traffic control.

In some embodiments, CAVH cloud sensing as a service 613 and control as a service 616 help system dynamic object mapping method. In some embodiments, dynamic object data is collected (e.g., through CAVH cloud system) using various sensors, e.g., to gather vehicle speeds, movements, queue lengths, and/or general performances. In some embodiments, dynamic mapping methods assist connected and/or automated vehicles, e.g., to perceive changes in the environment and/or to reduce uncertainties arising from, e.g., vehicle localization, ever-changing surrounding circumstances, and control plans. In some embodiments, infrastructure data provision and updating methods are supported by cloud storage service 620. In some embodiments, Traffic control devices (e.g., lane marking, signal control, traffic sign, and/or road geometry) communicate with connected and/or automated vehicles, e.g., using a dedicated wireless channel. In some embodiments, the infrastructure data enables a location-based control strategy to improve efficiency and stability.

In some embodiments, event data collection and distribution methods are supported by cloud sensing as a service 618. In some embodiments, event data includes, e.g., incidents, work zones, special events, etc., e.g., that produce a breakdown in traffic flow. In some embodiments, CAVH system employs these data, e.g., for monitoring of congestion and avoiding higher congestion levels caused by traffic influencing events.

In some embodiments, Control Signal/Logic Optimization methods are completed through CAVH system control as a service 616 and sensing as a service 613. In some embodiments, the CAVH system is designed based on, e.g., real-time feasibility, computational speed, comfort, safety, fuel consumption, and/or precise information on vehicle position and velocity. In some embodiments comprising use of control signal/logic optimization methods, CAVH system provides accurate and endless trip information for operation.

In some embodiments, CAVH cloud system provides system supply-demand estimation through planning as a service 610 and prediction as a service 614. In some embodiments, system supply-demand management depends on real-time traffic state and/or historical travel information. In some embodiments, trip information data comprises, e.g., travel time, trip length, trip duration, mode choice, frequency, alternative routes, etc. In some embodiments, traffic state information is used to adjust connected and/or automated vehicle scheduling adaptively.

In some embodiments, vehicle dispatching and routing management methods are supported by planning as a service 612 and prediction as a service 615. In some embodiments, vehicle dispatching, activation, and deactivation are controlled by cloud services to determine optimized trajectories. In some embodiments, the decision inputs include, e.g., vehicle position, orientation, velocity, steering angle, and/or geometric information. In some embodiments, CAVH system improves, e.g., traffic efficiency, reliability, safety, emissions, and operational costs for transportation agencies.

In some embodiments, system maintenance is supported by CAVH cloud system planning as a service 611. In some embodiments, maintenance involve one or more or all components of CAVH system, including communication equipment (DSRC), OBU (on board units), RSU (road side unit), traffic detectors (CCTV, midblock detectors), vehicle sensing devices (Lidar, radar, computer-vision-based sensor), and cloud services. In some embodiments, an advanced system maintenance plan is implemented to monitor the health of the system.

In some embodiments, as shown in FIG. 7, CAVH system cloud services 701 provide data computation, data integration, and/or management at various levels, including Network level, Corridor level, Link level, Node level, and Vehicle level. In some embodiments, designed cloud service systems also share and exchange data with current Traffic management center 702.

In some embodiments, cloud systems provide services as planning 711, prediction 714, and storage 716 for Network-level data management. In some embodiments (e.g., to optimize the performance of existing multimodal infrastructure), network performance measurements are recorded and analyzed (e.g., level-of-service (LOS), delay, reliability, VMT, fatality rate, crash data, etc.) to serve the purpose of safety and mobility.

In some embodiments, CAVH cloud services at the Corridor level (e.g., planning 712, prediction 715, and storage 717) assist corridor management by incorporating multimodal and traffic management strategy. In some embodiments, Corridor-level data are used for coordination and control of, e.g., vehicle platooning, maximizing road usage, and/or adjusting the in-vehicle distance according to surrounding environment. Corridor data includes agencies' collaboration and integration of existing infrastructure along major corridors, considering corridor as a multimodal system and provide guidance for the benefits of entire corridor.

In some embodiments, CAVH cloud services at the link level (e.g., comprising sensing 713 and storage 718) collect and preserve link-level data (e.g., average link distance between different nodes and/or number of links within the network). In some embodiments, link data are used when CAVH vehicles optimize their routes and departure times by considering infrastructure control and command data as decision variables.

In some embodiments, CAVH cloud services at the node level (e.g., storage 719, control 720, and storage 723 services) collect traffic information (e.g., lane marking, signal control, traffic sign, and merging/diverging) communicate with connected and automated vehicles through dedicated wireless channel.

In some embodiments, CAVH cloud systems at the vehicle level provide services (e.g., control 721, security 722, and privacy 724) that assist vehicle control processors to execute commands accurately by removing errors and disturbances. In some embodiments, steering, thrust, and brake data are used as input for trajectory control to enhance the overall performance of traffic system. In some embodiments, the CVAH system warns drivers of threats, e.g., by sending command data (e.g., vehicle coordination, lane selection, and steering angle) so that drivers can take appropriate action.

In some embodiments, a Traffic management center exchanges data with one or more of the network level 729, corridor level 730, link level 731, and/or node level 732. In some embodiments, CAVH vehicles connect with cloud data at one or more of the corridor level 707, link level 708, node level 709, and/or vehicle level 710.

In some embodiments, as shown in FIG. 8, the technology provides a CAVH Cloud-based cybersecurity system. In some embodiments, cybersecurity system 801 comprises one or more of the following components: cyber-attacks detection method 802, cyber-attacks profiling and identifying method 803, and/or cyber-attacks countermeasure methods 804. In some embodiments, the cybersecurity system detects malicious cyber activities 805 (e.g., duplicated vehicle ID, over-frequent communication requests, etc.) and abnormal physical phenomenon 806 (e.g., abnormal speed/location, "invisible" vehicles, etc.). In some embodiments, the detected activities are analyzed to extract their manifestations and features 809 and match them with the cyber-attacks definition database 808 to identify the cyber-attack type 810. In some embodiments, the corresponding countermeasures 804 are invoked as appropriate for the identified cyber-attack(s). In some embodiments, countermeasure methods include, but are not limited to: 1) CAVH-system-based countermeasures 814 comprising, e.g., cross-validation countermeasures 816 against "fake information" cyber-attacks (e.g., Sybil attack, fake accident attack, etc.), communication redundancy countermeasures 817 against communication network attacks (e.g., DDOS), and active defense 818 against abnormal activities that are not matched to a defined cyber-attack, but whose features/manifestations threaten the cybersecurity of CAVH cloud system; and/or 2) General network security countermeasures 815 comprising cybersecurity software 820 (e.g., to protect the software environment of CAVH cloud system) and firewall devices layer 821 (e.g., to physically protect the network of CAVH cloud system).

In some embodiments, as shown in FIG. 9, the technology provides a CAVH Cloud-based privacy protection system. In some embodiments, the technology provides a layered user information protection and anonymization central control system 901 comprising one or more of the following components: Confidential layer system 902, User-consented shared with CAVH system layer system 903, User-consented shared with public layer system 904, and public information system 905. In some embodiments, the functions of the layer-based systems include, e.g., information categorized to be treated by one or more layers:

Confidential layer: information that is severely privacy protected (e.g., systems, networks, interfaces, CAVH operation data, and user sensitive data etc.);

User-Consented Shared with CAVH System layer: information only shared with CAVH system under user permission (e.g., user account, travel plan, travel preference, and other incident-triggered or general user or vehicle behavioral data collection etc.);

User-consented shared with friends layer: information such as, e.g., location, trajectory, and/or personal messages that users would like to share with friends;

User-Consented Shared with Public layer: information only shared with public under user permission (e.g., user photo, user phone number, ridesharing-based travel origin and destination (OD), and/or travel trajectory, etc.);

Public Information layer: information shared with the public (e.g., statistical data, aggregate data, and enciphered data etc.).

In some embodiments, the functions of the layer-based systems include, e.g., information categorized to be treated according to one or more of:

CAVH user and vehicle anonymous profiling: aggregated user and vehicle types for pre-configuring service and operational types, schemes, and strategies.

CAVH Trip Information Privacy Protection: one-way and/or bidirectional encryption methods and aggregated methods for CAVH trip information privacy protection including travel trajectory, trip origin and destination (OD), and CAVH entry/existing location etc.

CAVH Sensing Data Privacy Protection: desensitize high-resolution methods and anonymization methods for CAVH sensing data privacy protection including trajectory fragmentation, human face blurring, cellphone number encryption etc.

CAVH Access Control (Data element availability): Layered access control methods for CAVH local and global data availability management comprising user data, vehicle activity data, and system control data access control.

Although the disclosure herein refers to certain illustrated embodiments, it is to be understood that these embodiments are presented by way of example and not by way of limitation.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A Cloud-based Model Deployment and Control System (CMDCS) comprising:

a) a vehicle comprising an onboard unit (OBU), which comprises a vehicle control module configured to execute control instructions for driving tasks;

b) a cloud-based platform configured to provide information and computing services to support a connected and automated vehicle highway (CAVH) system, and generates and provides detailed time-sensitive vehicle specific control instructions; and c) a Vehicle-to-System component configured to connect the CAVH vehicle and the CAVH cloud-based platform, and send data and control instructions to the vehicle to support CAVH driving;

wherein said CMDCS provides and performs cloud-based analytic and optimization methods; and wherein said CMDCS provides vehicle control instructions comprising a longitudinal acceleration rate, a lateral acceleration rate, and/or a vehicle orientation.

2. The system of claim 1, wherein the OBU comprises a data collection module configured to collect data from external vehicle sensors and internal vehicle sensors, and to monitor vehicle status and driver status; said OBU collects data comprising: vehicle engine status; vehicle speed; goods status; surrounding objects detected by vehicles; and/or driver conditions to monitor vehicle status and driver status.

3. The system of claim 1, wherein said vehicle control module of OBU is configured to execute control instructions for driving tasks comprising car following and/or lane changing; assume control of a vehicle when the automated driving system fails; and/or assume control of a vehicle when the vehicle condition and/or traffic condition prevents the automated driving system from driving said vehicle.

4. The system of claim 1, wherein said cloud-based platform comprises:

a) a localization-enhancement subsystem configured to fuse data in the cloud to improve the accuracy of self-positioning; and/or b) a Cloud Data Computing/Integration/Management component configured to process, integrate, and manage CAVH data in the cloud at the network, corridor, link, node, and vehicle levels.

5. The system of claim 1, wherein said cloud-based platform comprises a sensing as a service sub-system, a prediction as a service sub-system, a planning as a service sub-system, a control as a service sub-system, a connectivity as a service subsystem, a privacy as a service sub-system, a security as a service sub-system, and/or a storage as a service sub-system.

6. The system of claim 5, wherein event data collection and distribution methods are supported by the Sensing as a Service sub-system, wherein the event data comprise one or more of traffic incident, network congestion pattern, weather event, lane-blocking, special event, breakdown in traffic flow, and/or work zone.

7. The system of claim 5, wherein the Prediction as a Service sub-system comprises cloud computing methods for CAVH system prediction and/or analysis, which comprise methods for vehicle activity prediction and/or analysis, which is configured to analyze mechanical status, predicting system failure, and/or predicting optimal speed.

8. The system of claim 5, wherein the Planning as a Service sub-system is configured to provide cloud-computing based methods for CAVH operational planning, comprising vehicle operational planning methods, which comprise receiving and/or providing data characterizing departure time, origin, destination, route, vehicle dispatching, vehicle security, and/or emergency planning.

9. The system of claim 5, wherein the Control as a Service sub-system comprises cloud-computing methods for CAVH vehicular control, comprising:

a) the methods for vehicle operational control comprise receiving and/or providing data characterizing vehicle speed, direction, map coordinate, and/or spacing relative to other vehicles;

b) the methods for corridor activity control comprise managing automated driving, merging with non-CAV vehicles, and/or interacting with a vehicular ad hoc network (VANET) service;

c) the methods for global activity control comprise receiving and/or providing data characterizing routes, detour, parking, traffic load, congestion; and/or managing first and/or last mile control of vehicles; and/or d) the methods for system operational control comprise communicating between one or more of an OBU, roadside unit (RSU), Traffic Control Unit (TCU), and/or Traffic Control Center (TCC); optimizing a network; and/or responding to a security and/or emergency event.

10. The system of claim 5, wherein said cloud-based platform comprises a Control subsystem, which provides control instructions using a remote component, which is configured to control the CAVH vehicle in response to emergency, theft, physical attack, and/or cyberattack.

11. The system of claim 1, which is configured to provide:

a) vehicle data collected by the vehicle OBU from external vehicle sensors and internal vehicle sensors and event data collected by the cloud-based platform;

b) data computation, data integration, and/or data management at various levels, including Network level, Corridor level, Link level, Node level, and Vehicle level;

c) computing and management, and/or analytics and optimization component;

d) onsite and remote control; and/or e) planning, prediction, control, remote control, and/or optimization to support automated driving.

12. The system of claim 11, wherein said data management is configured to manage crowd-sourced sensor data; implement a method comprising managing data from onboard sensors of a vehicle, data from surrounding vehicles, data from road-side sensors, and sensor data shared from other nearby CAVH vehicles; fuse data in the cloud to improve the accuracy of self-positioning, wherein said data comprises one or more of crowd-sourced sensor data, self-positioning data, and/or map data.

13. The system of claim 11, wherein said data integration is configured to perform vehicle-level data aggregation and integration, comprising tasks to:

a) analyze and estimate vehicle state, comprising analysis of steering, thrust, and brake data;

b) assist a control processor to execute commands, reduce errors, and disturbances; and/or c) exchange vehicle state data with CAVH vehicles; and to communicate with non-CAVH vehicles.

14. The system of claim 11, wherein said optimization component is configured to comprise:

a) a System Analytics/Optimization component configured to perform System Analytics/Optimization Methods;

b) a CAVH operational optimization component configured to optimize system level tasks; and/or c) an operational optimization component to analyze vehicle traces using deep learning.

15. The system of claim 14, wherein said optimization component is configured to implement:

a) a control signal/logic optimization method comprising providing control signals and/or a logic optimization algorithm to optimize vehicle specific control instructions; and/or b) a vehicle dispatching and routing management optimization method comprising one or more of minimizing total travel time, minimizing waiting time and deadheading time, and/or increasing system reliability and safety.

16. A Cloud-based Model Deployment and Control System (CMDCS) comprising:

a) a cloud-based platform configured to provide information and computing services to support a connected and automated vehicle highway (CAVH) system, and generates and provides detailed time-sensitive vehicle specific control instructions; and b) a Vehicle-to-System component configured to connect the CAVH vehicle and the CAVH cloud-based platform, and send data and control instructions to the vehicle to support CAVH driving;

wherein said CMDCS provides and performs cloud-based analytic and optimization methods;

wherein said CMDCS provides vehicle control instructions comprising a longitudinal acceleration rate, a lateral acceleration rate, and/or a vehicle orientation.

17. The system of claim 16, wherein said cloud-based platform comprises a sensing as a service sub-system, a prediction as a service sub-system, a planning as a service sub-system, a control as a service sub-system, a connectivity as a service subsystem, a privacy as a service sub-system, a security as a service sub-system, and/or a storage as a service sub-system.

18. The system of claim 16, wherein event data collection and distribution methods are supported by the Sensing as a Service sub-system, wherein the event data comprise one or more of traffic incident, network congestion pattern, weather event, lane-blocking, special event, breakdown in traffic flow, and/or work zone.

19. The system of claim 16, wherein said data management is configured to manage crowd-sourced sensor data; implement a method comprising managing data from onboard sensors of a vehicle, data from surrounding vehicles, data from road-side sensors, and sensor data shared from other nearby CAVH vehicles; fuse data in the cloud to improve the accuracy of self-positioning, wherein said data comprises one or more of crowd-sourced sensor data, self-positioning data, and/or map data.

20. The system of claim 16, wherein the Control as a Service sub-system comprises cloud-computing methods for CAVH vehicular control, comprising:

a) the methods for vehicle operational control comprise receiving and/or providing data characterizing vehicle speed, direction, map coordinate, and/or spacing relative to other vehicles;

b) the methods for corridor activity control comprise managing automated driving, merging with non-CAV vehicles, and/or interacting with a vehicular ad hoc network (VANET) service;

c) the methods for global activity control comprise receiving and/or providing data characterizing routes, detour, parking, traffic load, congestion; and/or managing first and/or last mile control of vehicles; and/or d) the methods for system operational control comprise communicating between one or more of an OBU, RSU, TCU, and/or TCC; optimizing a network; and/or responding to a security and/or emergency event.

\* \* \* \* \*